(12) United States Patent
Song et al.

(10) Patent No.: US 10,830,661 B2
(45) Date of Patent: Nov. 10, 2020

(54) SYSTEMS AND METHODS FOR SCOUR MONITORING WITH FIBER OPTIC SENSORS

(71) Applicant: University of Houston System, Houston, TX (US)

(72) Inventors: Gangbing Song, Pearland, TX (US); Xuan Kong, Houston, TX (US); Siu Chun Michael Ho, Sugar Land, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 488 days.

(21) Appl. No.: 15/566,976

(22) PCT Filed: May 26, 2016

(86) PCT No.: PCT/US2016/034256
§ 371 (c)(1),
(2) Date: Oct. 16, 2017

(87) PCT Pub. No.: WO2016/191530
PCT Pub. Date: Dec. 1, 2016

(65) Prior Publication Data
US 2018/0120192 A1 May 3, 2018

Related U.S. Application Data
(60) Provisional application No. 62/166,476, filed on May 26, 2015.

(51) Int. Cl.
*G01M 3/14* (2006.01)
*G01M 3/38* (2006.01)
(Continued)

(52) U.S. Cl.
CPC .............. *G01M 3/141* (2013.01); *G01M 3/12* (2013.01); *G01M 3/38* (2013.01);
(Continued)

(58) Field of Classification Search
CPC .......... G01M 3/141; G01M 3/12; G01M 3/38; G01N 21/7703; G01N 21/774; G01N 2021/7723; G02B 6/0208; G02B 6/02209
See application file for complete search history.

(56) References Cited

U.S. PATENT DOCUMENTS 6,526,189 B1   2/2003   Yankielun
6,683,297 B2   1/2004   Schulz et al.
(Continued)

FOREIGN PATENT DOCUMENTS

| JP | H11-271058 A | 10/1999 |
| JP | 2001-296151 A | 10/2001 |
| JP | 2004-163219 A | 6/2004 |

OTHER PUBLICATIONS

"Instrumentation design for bridge scour monitoring using fiber Bragg grating sensors", by Xiong et al. see attached publication. (Year: 2012).*
(Continued)

*Primary Examiner* — Xin Y Zhong
(74) *Attorney, Agent, or Firm* — Winstead PC

(57) ABSTRACT

A scour monitoring system may provide a housing that is separated into multiple segments that are fluidically isolated from each other. The scour monitoring system may be position adjacent to a structure to be monitored for bridge scouring. Each of the segments may provide a water-swellable material positioned near or in contact with a fiber Bragg grating (FBG) cable. If water penetrates a segment, the water-swellable material may expand to deform the FBG cable. The wavelength of the FBG cable may be monitored
(Continued)

periodically for changes, thereby providing moisture detection when a change in wavelength is detected.

19 Claims, 12 Drawing Sheets

(51) Int. Cl.
 *G01M 3/12* (2006.01)
 *G01N 21/77* (2006.01)
 *G02B 6/02* (2006.01)
(52) U.S. Cl.
 CPC ....... *G01N 21/7703* (2013.01); *G01N 21/774* (2013.01); *G01N 2021/7723* (2013.01); *G02B 6/0208* (2013.01); *G02B 6/02209* (2013.01)

(56) References Cited

U.S. PATENT DOCUMENTS

| | | | |
|---|---|---|---|
| 7,228,900 | B2 | 6/2007 | Schultz et al. |
| 7,777,496 | B2 | 8/2010 | Evans et al. |
| 2007/0116402 | A1* | 5/2007 | Slade .................... G01N 21/81 385/12 |
| 2011/0265547 | A1 | 11/2011 | Ansari et al. |
| 2012/0082415 | A1 | 4/2012 | Grosso et al. |
| 2012/0226441 | A1 | 9/2012 | Willden et al. |
| 2014/0102190 | A1 | 4/2014 | Song et al. |

OTHER PUBLICATIONS

Y.B. Lin, K.C. Chang, J.S. Lai, and I.W. Wu. "Application of optical fiber sensors on local scour monitoring." Proceedings of the IEEE Sensors 2004, 2, 832-835, Vienna, Austria.

Y.B. Lin, J.C. Chen, K.C. Chang, J.C. Chem, and J.S. Lai. "Real-time monitoring of local scour by using fiber Bragg grating sensors." Smart Materials and Structures, 14(4) (2005), 664-670.

Y.B. Lin, J.S. Lai, K.C. Chang, L.S. Li. "Flood scour monitoring system using fiber Bragg grating sensors." Smart Materials and Structures, 15 (2006), 1950-1959.

Lu, J. Y., Hong, J. H., Su, C. C., Wang, C. Y., and Lai, J. S. (2008). "Field measurements and simulation of bridge scour depth variation during floods." Journal of Hydraulic Engineering, 134(6), 810-821.

Z. Zhou, M.H. Huang, L.Q. Huang, J.P. Ou, G. Chen. "An optical fiber Bragg grating sensing system for scour monitoring." Advances in Structural Engineering, vol. 14 (2011), 1, 67.

W. Xiong, C.S. Cai, X. Kong. "Instrumentation design for bridge scour monitoring using fiber Bragg grating sensors." Applied Optics, vol. 51(2012), No. 5, 547-557.

A. Zarafshan, A. Iranmanesh, and F. Ansari. "Vibration-based method and sensor for monitoring of bridge Scour." J. Bridge Eng. 17 (2012), Special Issue: Nondestructive Evaluation and Testing for Bridge Inspection and Evaluation, 829-838.

X. Kong, C.S. Cai, S. Hou. "Scour effect on a single pile and development of corresponding scour monitoring methods." Smart Materials and Structures, 22(5) (2013), 055011.

T.L. Yeo, M.A.C. Cox, L.F. Boswell, T. Sun, and K.T.V. Grattan. "Monitoring Ingress of Moisture in Structural Concrete Using a Novel Optical-Based Sensor Approach." Journal of Physics: Conference Series, 45(2006): 186-192.

T. L. Yeo, T. Sun, and K.T.V. Grattan. "Fibre-optic sensor technologies for humidity and moisture measurement." Sensors and Actuators A 144(2008): 280-295.

T.E. Brook, M.N. Taib, R. Narayanaswamy. "Extending the range of a fibre optic relative humidity sensor". Sensors and Actuators B, 38-39 (1997): 272-276.

S. Otsuki, K. Adachi, and T. Taguchi. "A Novel Fibre-Optic Gas Sensing Arrangement Based on an Air Gap Design and an Application to Optical Detection of Humidity". Analytical Sciences, 14(1998): 633-635.

H.E. Posch and O.S. Wolfbeis. "Fibre-optic humidity sensor based on fluorescence quenching". Sensors and Actuators, 15(1988): 77-83.

S. Muto, 0, Suzuki, T. Amano, and M. Morisawa. "A plastic optical fibre sensor for real-time humidity monitoring". Measurement Science Technology, 14 (2003): 746-750.

S. Luo, Y. Liu, A. Sucheta, M. K. Evans, and R. V. Tassell. "Applications of LPG fiber optical sensors for relative humidity and chemical-warfare-agents monitoring". Proc. SPIE 4920, 193 (2002): doi:10.1117/12.481973.

W.M. Healy, S. Luo, M. Evans, A. Sucheta, and Y. Liu. "Development of an optical fiber-based moisture sensor for building envelopes". 24th AIVC Conference & BETEC Conference, Ventilation, Humidity Control and Energy Proceedings, Oct. 14, 2003, Washington, DC.

T.L. Yeo, T. Sun, K.T.V. Grattan, D. Parry, R. Lade, and B.D. Powell. "Characterisation of a polymer-coated fibre Bragg grating sensor for relative humidity sensing". Sensors and Actuators B, 110 (2005): 148-155.

P. Lu, L., Men, and Q. Chen. "Polymer-Coated Fiber Bragg Grating Sensors for Simultaneous Monitoring of Soluble Analytes and Temperature". IEEE Sensors Journal, 9(4), (2009): 340-345.

J. Cong, X. Zhang, K. Chen, and J. Xu. "Fiber optic Bragg grating sensor based on hydrogels for measureing salinity". Sensors and Actuators B, 87 (2002): 487-490.

X.F. Huang, D.R. Sheng, K.F. Chen, and H. Zhou. "Low-cost relative humidity sensor based on thermoplastic plastic polyimide-coated fiber Bragg grating". Sensors and Actuators B, 127 (2007): 518-524.

\* cited by examiner

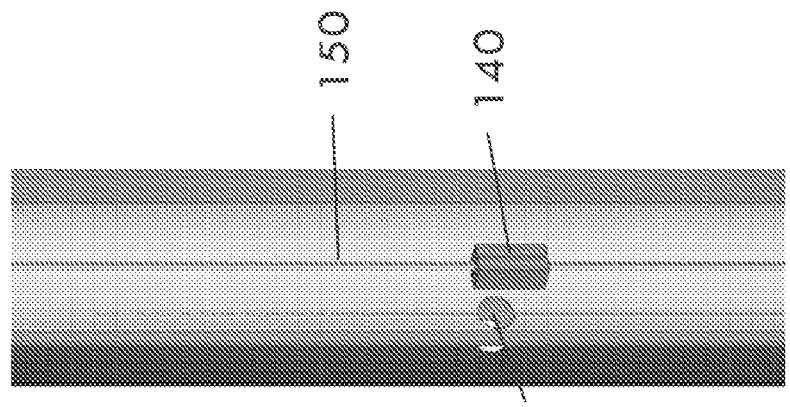
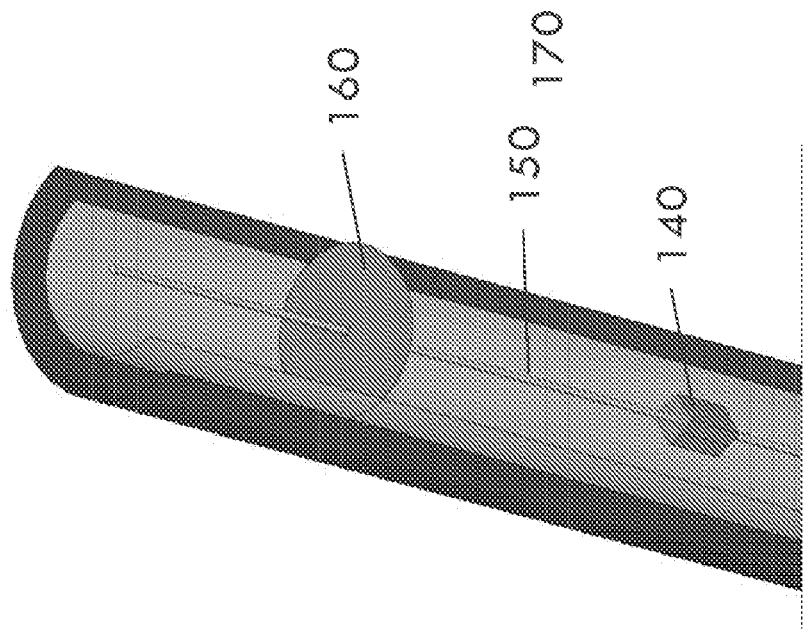
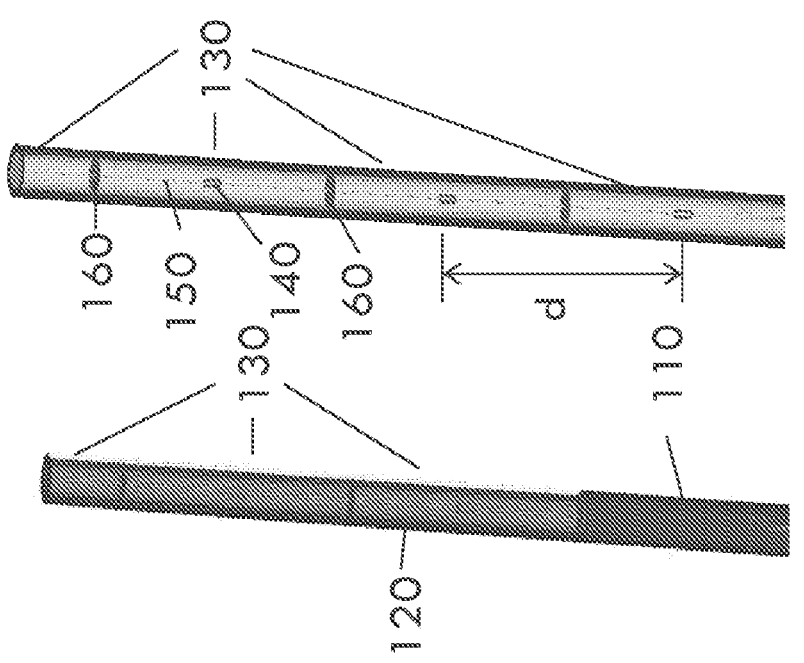
FIG. 4A  FIG. 4B  FIG. 4C  FIG. 4D

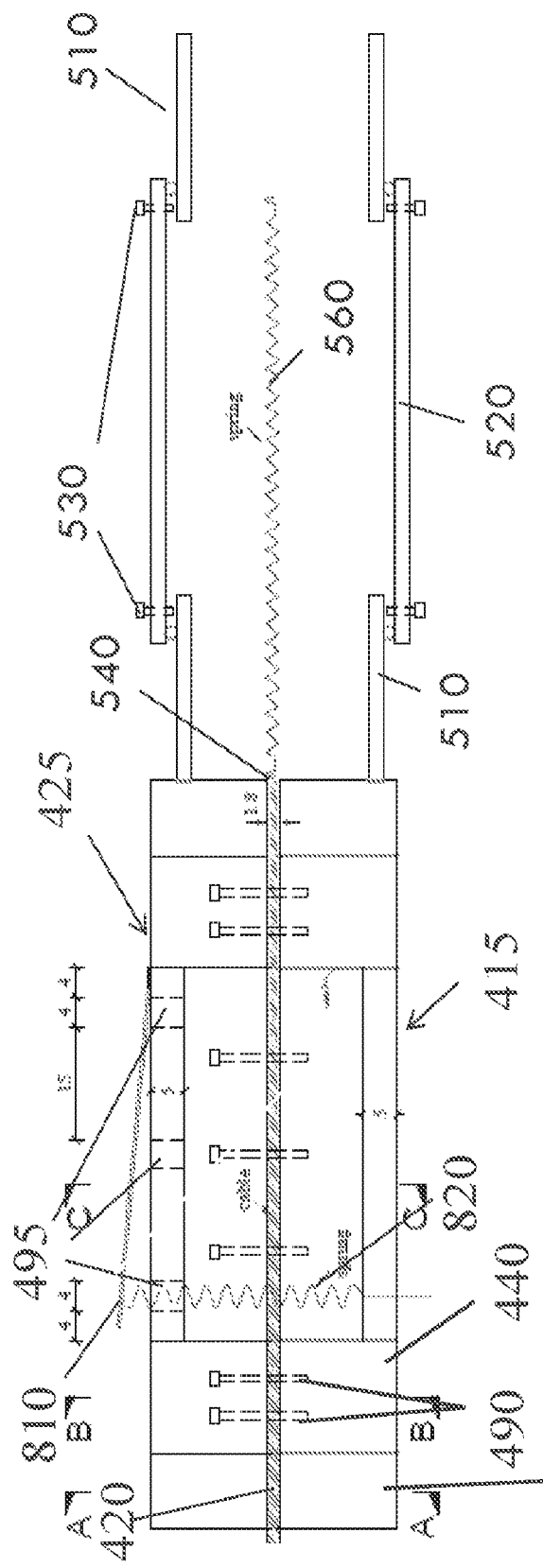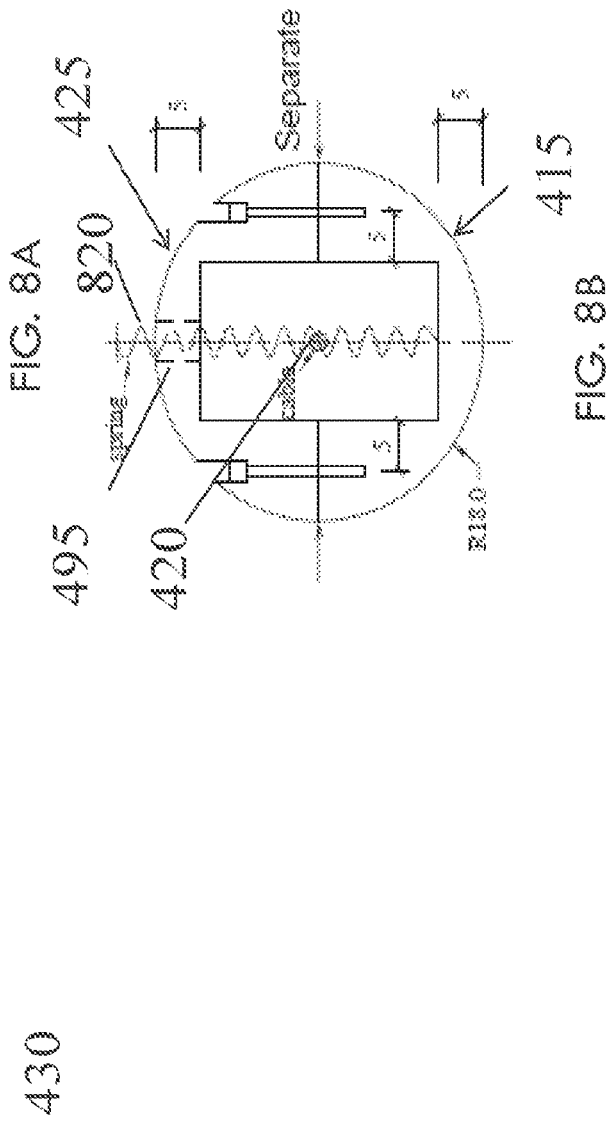
FIG. 8A
FIG. 8B

SYSTEMS AND METHODS FOR SCOUR MONITORING WITH FIBER OPTIC SENSORS

RELATED APPLICATIONS

This application claims the benefit of U.S. Provisional Patent Application No. 62/166,476 filed on May 26, 2015, which is incorporated herein by reference.

FIELD OF THE INVENTION

This invention relates to scour monitoring. More particularly, to scour monitoring utilizing a fiber optic sensors.

BACKGROUND OF INVENTION

Scour is the result of the erosive action of flowing water, which excavates and carries away sediment, such as sand, soil, rock, and/or gravel, from a structure. This removal of surrounding sand, soil, rock, or gravel around a structure, such as bridge pier, may compromise the structural integrity and unwantedly expose the structuring to flowing water. For example, bridge scour around bridge abutments or piers can compromise the integrity of the structure, and is one of the most common causes of highway bridge failure in the United States (e.g. ~60% of bridge failures).

The flow of water around an abutment may cause general scour, contraction scour, and/or local scour. At bridge openings, contraction scour can occur when water accelerates as it flows through an opening that is narrower than the channel upstream from the bridge. Water normally flows faster around piers and abutments making them susceptible to local scour.

Methods detecting and monitoring bridge scour may include radar, sonar, or time-domain reflectometry (TDR) based methods. However, these methods require complex computations, expensive equipment, etc.

Fiber optic sensors (FOSs) have many advantages over conventional sensors, especially with regards to being waterproof. Different types of FOSs designed for humidity/moisture measurements include spectroscopic, fluorescent, and in-fiber grating sensors. Long period gratings (LPGs) (e.g. 100 µm to 1 mm long grating) have been used to create humidity sensors. LPGs are more sensitive to changes in the refractive index of the medium surrounding the grating, and thus are more suited for chemical-based sensing. Fiber Bragg gratings (FBGs) (e.g. <1 µm long grating) on the other hand, are more sensitive to mechanical stimuli, such as strain, temperature, and pressure have been used as humidity sensors, where a thin layer of water-sensitive coating is applied to the FBG in order to sense the presence of water. A micrometer thick layer swells when water vapor is absorbed and the strain from the swelling is transferred and detected by the FBG, thus indicating the level of humidity. However, in certain situations (e.g. water leaking through cracks), the actual ingress of liquid water may be aliased as 100% humidity. In the prior work discussed in U.S. Pat. No. 9,222,877 to Song et al. and issued Dec. 29, 2015, a FBG moisture sensor was discussed.

The systems and methods discussed further herein provide scour monitoring utilizing fiber optic sensors. These systems and methods for scour monitoring provide a system that is relatively low in cost, uncomplicated, and easy to transport and install.

SUMMARY OF INVENTION

In one embodiment, a scour monitoring system may provide a housing that is separated into multiple segments that are fluidically isolated from each other. Each segment may provide one or more openings that allow fluid to enter the sensor chamber when soil does not cover the segment or when the soil is scoured away from the segment. The scour monitoring system may be position adjacent to a structure to be monitored for bridge scouring. Each of the segments may provide a water-swellable material positioned near or in contact with a fiber Bragg grating (FBG) cable. If water penetrates a segment, the water-swellable material may expand to deform the FBG cable. The wavelength of the FBG cable may be monitored periodically for changes, thereby providing moisture detection when a change in wavelength is detected.

A method for scour monitoring may comprise positioning a scour monitoring system adjacent to a structure. The scour monitoring system may comprise one or more segments, where each segment provides a water-swellable material positioned near or in contact with a FBG cable. A light source may periodically provide a signal to the FBG cable, and a photodetector may detect a wavelength of an output signal from the FBG cable. The system may be monitored for wavelength changes to determine whether a segment has been exposed to moisture.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 4A-4D are illustrative embodiments of internal components of a scour monitoring system;

FIGS. 8A-8B respectively show a cross sectional side view of a standard and adjustable unit, and a cross sectional view of a standard unit;

DETAILED DESCRIPTION

Figure 1:
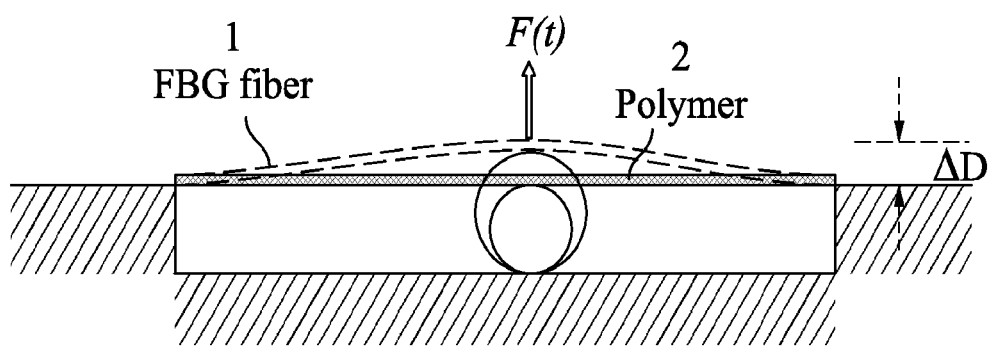
FIG. 1 shows a simplified model.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Systems and methods providing scour monitoring utilizing fiber optic sensors are discussed herein. The fiber optic sensor may be set-up to detect moisture, water, fluid or the like. The fiber optic sensor may comprise a Fiber Bragg Grating (FBG) cable, which is an optical fiber core inscribed with periodic perturbations of refractive index (gratings). The sensor may also include a water-swellable material positioned adjacent to or in contact with the FBG cable. A sensor housing may secure the components of the fiber optic sensor. In some embodiments, the scour monitoring system may utilize one or more fiber optic sensors.

The FBG cable can measure deformation, stress, or strain by analysis of its optical response, such as by monitoring for changes in wavelength. Additionally, the water-swellable material may expand when it contacts water or other fluids, which may deform the FBG cable due to its nearby proximity, thereby allowing the FBG cable and water-swellable material to act as a moisture sensor.

In some embodiments, a scour sensor may provide at least one standard unit and at least one adjustable unit. The standard unit may provide a sensor housing that encloses a FBG sensor and water-swellable material within a chamber. The FBG sensor may be tensioned a desired amount within the chamber with the water-swellable material in close proximity. The only opening to the chamber may be one or more holes. The scour sensor may also include one or more adjustable units with fixed housing coupled to a movable housing. These housing may allow the over length of the adjustable unit to be modified as desired.

Swelling Model

The swelling characteristics of SAPs were of interest to researchers and theories have been developed to describe the swelling properties of the polymers. Several mathematical models of SAP swelling exist, each pertaining to different variables that contribute to the osmotic pressure of the SAP. For the purposes of this study, we will only regard models relating diffusion to swelling (we assume electrolyte concentrations change negligibly during testing). Diffusion models are based on Fick's second law of diffusion, of which the one dimensional version is shown below as:

$$\frac{\partial c}{\partial t} = D\frac{\partial^2 c}{\partial x^2} \tag{1}$$

where c is the concentration of the solute and D is the diffusion coefficient. If convection is considered, an additional term is added to form an overall expression as:

$$\frac{\partial c}{\partial t} = D\frac{\partial^2 c}{\partial x^2} - \frac{\partial}{\partial x}cv \tag{2}$$

where v is the convective velocity of the front of the solvent moving through the polymer. Through Fourier transformation methods, the solution to Eq. (2) can take the closed form of:

$$c(x, t) = \frac{1}{2}\left[1 + \mathrm{erf}\left(\frac{vt - x}{2\sqrt{Dt}}\right)\right], vt > x \tag{3}$$

$$c(x, t) = \mathrm{erfc}\left(\frac{vt - x}{2\sqrt{Dt}}\right), vt \leq x \tag{4}$$

These solutions may be integrated together to form an expression of total swelling, s(t), as a function of time:

$$s(t) = \int_0^{vt} \frac{1}{2}\left[1 + \mathrm{erf}\left(\frac{vt - x}{2\sqrt{Dt}}\right)\right]dx + \int_{vt}^L \mathrm{erfc}\left(\frac{vt - x}{2\sqrt{Dt}}\right)dx \tag{5}$$

Equations (1)-(5) are used to calculate the diffusion and convection in one dimension (e.g. a film). In order to be fully used for the current water sensor, the equations need to be extended to three dimensions. However, the current form of the equations is sufficient for the simplified model discussed in following sections.

FBG Model

Fiber Bragg gratings are made by laterally exposing the core of a single-mode fiber to a periodic pattern of intense ultraviolet light. The exposure produces a permanent increase in the refractive index of the fiber's core, creating a fixed index modulation that is called a grating. At each periodic refraction change, a small amount of light is reflected. All the reflected light signals coherently combine to one large reflection at a particular wavelength when the grating period is approximately half the input light's wavelength. This is referred to as the Bragg condition, and the wavelength at which this reflection occurs is called the Bragg wavelength. Light signals at wavelengths other than the Bragg wavelength, which are not phase matched, are essentially transparent or transmitted. The Bragg wavelength $\lambda_B$ depends both on the physical characteristics of the fiber and geometrical characteristics of the grating:

$$\lambda_B = 2n_e \Lambda \tag{6}$$

where $n_e$=effective refractive index of the grating in the fiber core and $\Lambda$=grating period. Both the effective refractive index and grating period vary with the change in strain $\Delta\varepsilon$, temperature change $\Delta T$, and pressure change $\Delta P$, imposed on the fiber. If only the dominant linear effects of these three factors on FBG sensors are considered, neglecting higher-order cross-sensitivities, the amount of Bragg wavelength shift can be given by:

$$\frac{\Delta\lambda_B}{\lambda_B} = C_T\Delta T + C_\varepsilon\Delta\varepsilon + C_P\Delta P \quad (7)$$

where $\lambda_B$ is the Bragg wavelength (center wavelength), T is the temperature, $\varepsilon$ is the strain, P is the pressure, and $C_T$, $C_E$, and $C_P$ are their respective coefficients. Aside from a small temperature drop during contact with water, the temperature and pressure terms may be neglected for the purposes of this experiment. This leaves $C_\varepsilon$ to be defined as $$C_\varepsilon = \frac{n_{eff}^2}{2}[p_{12} - \mu(p_{11} + p_{12})] = [1 - P_e] \quad (8)$$

Where $n_{eff}$ is the effective refractive index of the reflected mode, $p_{11}$ and $p_{12}$ are the elasto-optic tensor coefficients, $\mu$ is the poisson ratio, and $P_e$ is the photoelastic constant of the fiber (assumed to be isotropic).

Combined Model

In order to characterize the water sensor, the relationship between the swelling of the polymer to the strain experienced by the FBG should be known and can be expressed as:

$$\Delta\varepsilon = p(t)s(t) \quad (9)$$

where p(t) is a proportion function that converts swelling to strain. The determination of p(t) is beyond the scope of this document. However, an alternative expression may be found by the beam theory. In order to demonstrate the interaction between the polymer and the FBG, a simplified model of the proposed water sensor is shown in FIG. 1.

Figure 2:
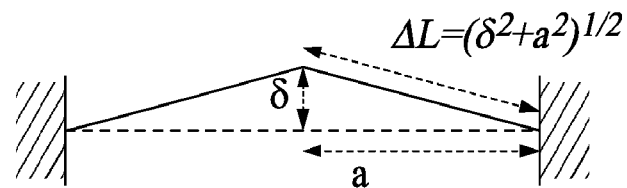
FIG. 2 shows an approximation of beam deformation due to deflection.

As seen in FIG. 1, the sensor 1 is approximated by a basic beam deflection problem. We assume the polymer 2 is located in the middle, i.e. a=0.5 L. The maximum deflection of the beam, $\delta$, which should occur at point a, is given by, $$\delta(t) = \frac{F(t)L^3}{192EI} \quad (10)$$

Where E is the Young's modulus of the beam, I is the moment of inertia, and F is the force acting at point a. In this case, the force is not a constant value due to the interaction between the FBG cable and the polymer, namely, the expansion of the polymer will apply a force on the cable while the cable will also restrain the polymer expansion. Hence, the measurement of the force is not easy. If we approximate the length deformation caused by the deflection ($\delta$) as seen in FIG. 2, the strain can be approximated as:

$$\Delta\varepsilon = \frac{2\sqrt{\delta^2 + a^2} - 2a}{2a} = \frac{\sqrt{\delta^2 + a^2}}{a} - 1 \quad (11)$$

For the simplified one dimensional model in FIG. 1, the cable deflection is approximate to the diameter change of the polymer, i.e. $\delta = \Delta D$. The strain can then be expressed as:

$$\Delta\varepsilon = \frac{\sqrt{\Delta D^2 + a^2}}{a} - 1 \quad (12)$$

Eq. (12) avoids the need to find p(t), however, an expression relating $\Delta D$ to the concentration of water in the polymer is needed in order to relate the FBG strain to the water input. Hence:

$$\frac{\Delta\lambda_B(t)}{\lambda_B} = C_\varepsilon\Delta\varepsilon = (1 - P_e)\left[\frac{\sqrt{\Delta D^2 + a^2}}{a} - 1\right] = (1 - P_e)p(t)s(t) \quad (13)$$

For the final model, we should assume a full immersion of the sphere into water, and the input should take a form indicating the time that the sphere was exposed to water (e.g. a unit step function with a cut off time). The objective of this model is to be able to infer the amount of water absorbed by the polymer from the FBG signal. For the purposes of developing the scour sensor, since the sensor system is submerged under water level, any leakage of water will quickly and inevitably lead to the full activation of the exposed sensors. In that case, the above equations will not be needed to know how much water has been absorbed. However, for usage in scenarios that have less water (or certain chemicals, depending on the polymer), the above analysis may be useful for determining the amount of absorption.

Scour Sensor Design

Figure 3:
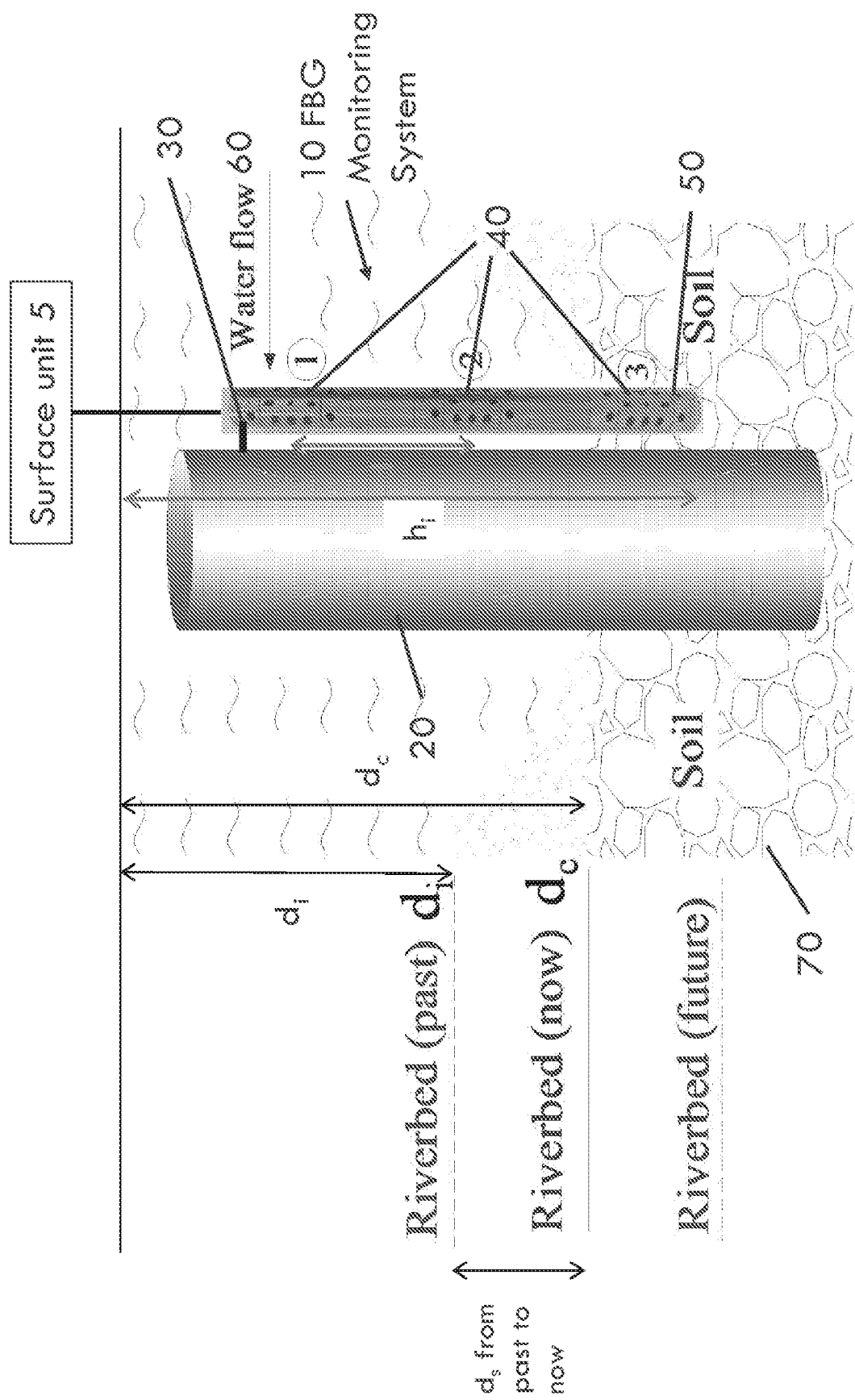
FIG. 3 is an illustrative embodiment of a scour monitoring system.

FIG. 3 is an illustrative embodiment of a scour or FBG monitoring system 10. For purposes of illustration, the scour monitoring system is illustrated with a bridge pier or abutment. However, it will be recognized by one of ordinary skill in the art that the scour monitoring system may be utilized in conjunction with any structure where scour monitoring may be desired, such as, but not limited to, bridges, levees, dams, subsea pipelines, offshore structures or foundations, wind turbine structures, or the like. The scour monitoring system 10 may be positioned adjacent to the structure 20 to be monitored, such as a pier, abutment, piles, or the like. A securing means 30, such as a bracket(s) or the like, may secure the scour monitoring system 10 in a desired location or position adjacent to the structure 20. For example, securing means 30 may be coupled to the structure 20, river bed, or the like. The scour monitoring system 10 may comprise one or more water sensors 40 may be positioned along the length of housing 50. The height from the surface of the water to the bottom of the housing is represented by the height ($h_i$). The housing 50 may be separated into multiple segments that are fluidically isolated, with each segment providing one or more moisture sensors 40. Each segment may provide one or more openings (not shown) allow water to enter the segment when soil is not present around the segment or when the soil is scoured away from the segment. The moisture sensors 40 may each provide a water-swellable material that is adjacent to or in contact with a FBG cable. The water-swellable material may expand when it comes into contact with water or fluid, thereby causing the FBG cable to deform/bend and causing a wavelength change that allows for moisture detection. Once the water or fluid flows out or evaporates, the water-swellable material may return to its original size, thereby allowing the FBG cable to return to its original shape. The water-swellable material may be in any suitable form, such as a bead, cube, or the like.

Each of the segments or units may be fluidically isolated from each other so that water entering one segment will not flow into another segment. In some embodiments, the segments/sensors may be separated by predetermined separation distances (d). As a nonlimiting example, the sensors may be disposed at periodic or non-periodic distances (d) along the length of the housing 50. Further, the sensors 40 may be monitored for changes in wavelength to determine whether a sensor/segment has been exposed to fluid. When a change in wavelength is detected, the corresponding sensor 40 may have been exposed to fluid. The periodic or non-periodic separation distance (d) between the segments/sensors 40 may be adjusted as desired to achieve a desired level of accuracy. Further, it is apparent that the depth of fluid exposure can be determined by determining the lowermost position of a sensor 40 detecting fluid exposure. The number of segments in the scour monitoring system 10 may be adjusted as desired to achieve a desired length. In some embodiments, the scour monitoring system 10 may also provide adjustable length sections that allow the length of the system to easily be adjusted to a desired length.

In order to perform scour and/or water level monitoring, the system 10 may be deployed adjacent to a structure 20. In some cases, the system may be secure to the structure 20 with a securing means 30. The surface unit 5 may be coupled to the system 10. As illustrated, water flow 60 passes the structure 20, and over time, sediment 70 may be eroded away to expose sensors 40 to the water. By monitoring the individual sensors 40 for moisture, which have a known separation distance (d), the depth of water exposure or level may be determined. While the example shown illustrates the separation between the sensors 40 to be approximately equal, the separation distance (d) between any of the sensors 40 in the system 10 can be adjusted as desired to achieve a desired separation distance between the sensors. The separation distance (d) between the sensors 40 is preferably adjusted before deployment. However, in systems 10 where adjustment is possible after deployment, the distance can be adjusted afterwards.

Once the system 10 has been deployed, an initial reading can be taken to determine the initial depth ($d_i$) from the surface to soil, such as a riverbed. As an example of determining the depth of initial water exposure ($d_i$), the initial readings from the sensors 40 can be analyzed to determine the top or highest sensor showing water exposure and lowest sensor showing water exposure. Because the distance between these two sensors 40 is known or can easily be calculated (e.g. by adding the total separation distance between the sensor), the initial depth ($d_i$) can easily be determined. As a nonlimiting example, since the total length of the scour monitoring system 10 and positions of the sensors 40 are known, the initial water level or water height ($h_i$) can easily be determined by determining the highest sensor indicating water exposure. In examples where a portion of the system 10 is submerged, the water height ($h_i$) can easily be determined by factoring in the length from the surface of the water to the top of the system 10. Further, comparison of historic and current data may allow the amount of scouring to be determined. After deployment, the scour monitoring system 10 may continue to periodically monitor the sensors 40 for changes in the wavelength. In some embodiments, the periodic monitoring may be set a user or operator, and may occur daily, weekly, monthly, etc. This data gathered from the sensors 40 may be gathered and stored.

As the system 10 continues to periodically monitor the sensors, a current water level, which may be characterized as prior water levels in the future, can be determined from the most recent data and the prior values, such as the initial water level. The prior or initial water levels can be compared to the current water level based on current measurement data to determine whether there has been any change in water level, e.g. to detect flooding, severe drought, or the like. In some embodiments, certain events may trigger a notice or alarm to the operator, such as the amount of scour exceeding a predetermined amount; the water level exceeding or less than a predetermined level; or an elapsed period of time (e.g. quarterly or bi-annual reports). In some embodiments, the operator may set values for when such notices are desired. It should be apparent that by comparing an initial depth ($d_i$) of water exposure at a time of interest ($t_i$), such as when the scour monitoring system 10 was first installed or at another time in the past, to a current measured depth ($d_c$) at a current time ($t_c$), a depth or amount of scouring ($d_s$) over that time period can be determined by subtracting a current depth from the initial depth ($d_s = d_c - d_i$). Afterwards, the system 10 may continue to monitor the sensors 40. If an updated amount of scouring since the prior measurements are desired, the updated amount of scouring can be determined by determining the updated measured depth ($d_{c+1}$) and subtracting the update measured depth from the prior measurements ($= d_{c+1} - d_c$).

The scour monitoring system 10 provides for short-term detection or long-term monitoring of bridge scour. The scour monitoring system 10 is sensitive to water and other fluids and is capable of detecting/monitoring river bed changes for scour around the bridge abutment/piers. The scour monitoring system 10 is easy to transport and install in the field. FIGS. 4A-4D are illustrative embodiments of internal components of a scour monitoring system. A outer cylinder 110 is used as housing to protect an inner tube 120 from water before the system is installed at a desired location. The inner tube 120 may be divided into multiple segments 130, which may each house fiber optic sensor(s). While outer cylinder 110 and inner tube 120 are illustrated as being right circular cylinders, other embodiments may utilize any cylindrical shape suitable for housing internal components of the system, such as a rectangular cylinder, elliptical cylinder, square cylinder, or the like. In some embodiments, each segment may house a single fiber optic sensor. In other embodiments, two or more fiber optic sensors could be arranged in a segment 130 if increased resolution is desired. Further, the separation distance (d) between fiber optic sensors can be adjusted in accordance with a desired resolution.

A reading of wavelength(s) of the FBG cable in dry conditions provides a baseline value(s) that may be utilized to determine if moisture has been detected later when the system is deployed. Once the system is deployed, the wavelengths of each segment may be monitored for changes from their baseline values. Further, initial deployment measurements may be taken to determine the initial depth of fluid exposure. Since a length of the housing and length of each segment may be known or easily determined, an operator or user can easily compare measurements at the time of initial deployment to future values to determine an approximate depth of scouring.

A method for scour monitoring may comprise positioning a scour monitoring system 10 adjacent to a structure such as shown in FIG. 3. As discussed previously, the scour monitoring system may comprise one or more segments, where each segment provides a water-swellable material positioned near or in contact with a FBG cable. A FBG interrogator, memory, processor, transceiver and the like (not shown) may be coupled to the scour monitoring system. As a nonlimiting example, a surface unit providing the aforementioned components may be provided at a readily accessible location near the scour monitoring system 10. As a nonlimiting example, a surface unit 5 may be coupled to the scour monitoring system 10 and may provide the FBG interrogator, memory, processor, transceiver, or a combination thereof. It will be apparent to one of ordinary skill in the art that a light source or laser may periodically provide a signal to the FBG cable, and the interrogator may detect a wavelength of a return signal from the FBG cable. The memory may be utilized to store gathered data, and may also store firmware, software or the like for managing operation of the scour monitoring system. The processor may implement desired operation of the scour monitoring system. For example, the processor may control operation of the light source, interrogator, reading/writing to the memory, or the like. In some embodiments, the scour monitoring system 10 may also provide a wireless transceiver to allow the system to communicate wirelessly. The transceiver may be utilized to transmit data, such as data gathered by the sensors to remote computer, laptop, cellphone, tablet, or the like. The transceiver may be utilized to receive data as well, such as control data or instructions for operating the scour monitoring system, from a remote computer, laptop, cellphone, tablet, or the like.

The system may be periodically monitored at any predetermined time interval for wavelength changes to determine whether a segment has been exposed to moisture. For example, the system may compare wavelength measurements to prior wavelength measurement data to determine if the wavelength has changed. If a change in wavelength is detected, a current depth ($d_c$) of water exposure can be detected by determining a depth of the lowest positioned sensor indicating water exposure. Further, the current depth may be compared to an initial depth ($d_i$) or previously measure depths of water exposure to determine how much scouring has occurred.

Further discussion of FBG cables and water-swellable materials can be found in U.S. Patent Appl. Pub. No. 2014/0102190 (Appl. No. 14/054,156) to Song et al., which is incorporated herein by reference.

A water-swellable material is material that swells as it absorbs liquid. In a preferred embodiment, the water swellable material is a super absorbent polymer (SAP). A SAP is a polymer that can absorb several hundred times its own mass. SAPs can be seen as a network of crosslinked polymers containing ionic functional groups (e.g. carboxylate anions and sodium cations). The ionic groups produce a driving force that encourages water to be absorbed and retained within the polymer network. Together with elastic forces and polymer-solvent interactions, the ionic gradient comprises the osmotic pressure of the SAP. The SAP behaves so that the osmotic pressure is zero. In some embodiments, the SAP may be Sodium Polyacrylate $(C_3H_3NaO_2)_n$, which is a low cost SAP. This particular SAP relies on the —COONa functional groups to form an ionic potential that encourages the entry of water molecules into the polymer network. As more water enters the network, the functional groups become the less ionic —COOH group, thus slowing down the influx of water. Other nonlimiting examples of SAPs include sodium polyacrylate, cross-linked polyacrylates, starch-graft polymers, or the like. The water-swellable material is positioned adjacent to the FBG cable so that the FBG contacts the water-swellable material. Expansion of the water-swellable material due to fluid absorption causes strain to the FBG cable. The strain created by the absorbed fluid causes the reflected wavelength of the FBG cable to shift, thereby allowing the sensor to detect moisture when such a shift is detected. A securing mechanism restricts movement of the water-swellable material in the sensor to prevent it from moving to an unsuitable position for detecting moisture. As a nonlimiting example, the water-swellable material may be retained in a water-permeable chamber. In some embodiments, the securing mechanism may restrict longitudinal movement of the water-swellable material. In some embodiments, the system may also provide a temperature sensor to compensation for temperature effects on the FBG cable.

In some embodiments, two or more FBG cables may be multiplexed. Chaining multiple FBG sensors into one branch may allow multiple FBG sensors to be read by one channel. By chaining multiple FBGs together, one can form a large FBG sensor network while minimizing the amount of used channels in a data acquisition board.

FIGS. 4C-4D provide enlarged views of a segment of the scour monitoring system. Sensor housing 140, fiber optic cable 150, and isolation mechanism 160 may be provided in each segment 130. Sensor housing 140 may secure active portions of the sensor, such as a FBG cable, water-swellable material, etc. Fiber optic cable 150 runs approximately parallel to the axis of the inner tube 120, wherein an active FBG portion is secured within the sensor housing 140. The fiber optic cable 150 may be fixed at both ends to provide tension. Isolation mechanisms 160 may be positioned at opposite ends of sensor housing 140 to isolate each segment 120 from fluids in other segments. For each segment 130, an opening 170 may be provided in the inner tube 120 to allow water to enter the segment. When a segment 130 is in the ground with sediment blocking opening 170, there is no change to the fiber optic sensor because it has not been exposed to moisture. However, when scouring exposes the opening 170, water may enter that segment and cause the water-swellable material to expand after absorbing water and the FBG cable's wavelength starts to change.

Based on the sensor mechanism discussed above, a sensing assembly using FBG sensors and water-swellable polymers to detect/monitor the scour damage or water presence is contemplated. As a major component of the scour monitoring system, the sensor housing is specifically designed and separated into multiple segments that are fluidically isolated from each other. As a nonlimiting example, the sensor housing may be made of steel, another metal, plastic, or any other durable material that can withstand prolonged exposure to water and scour.

Figure 5:
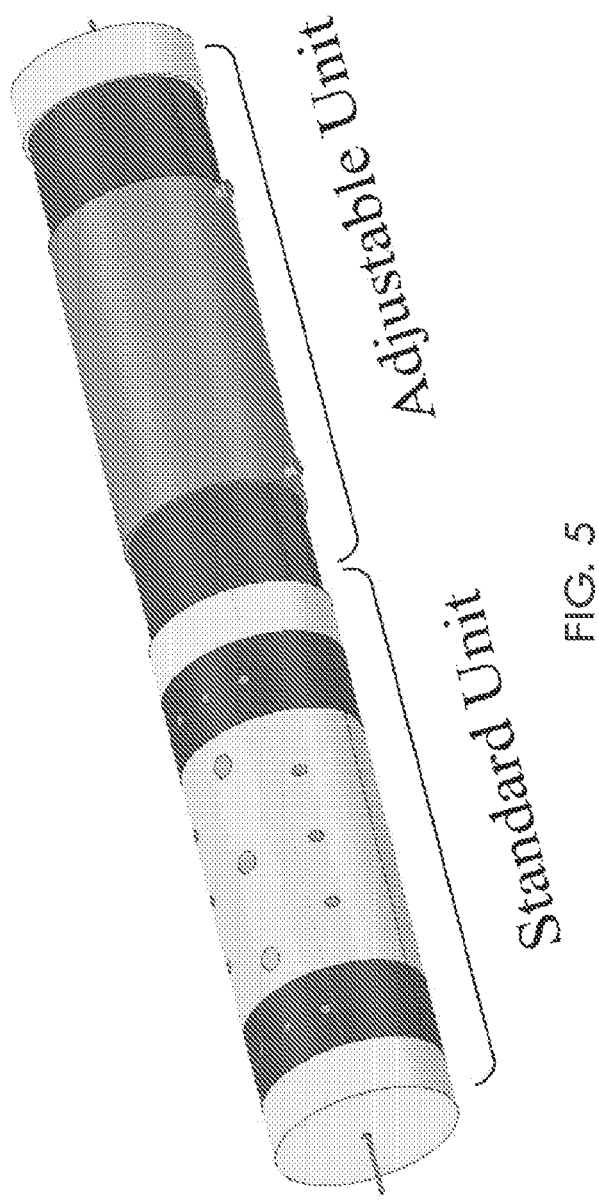
FIG. 5 shows a scour sensor system comprising two types of units.
Figure 6:
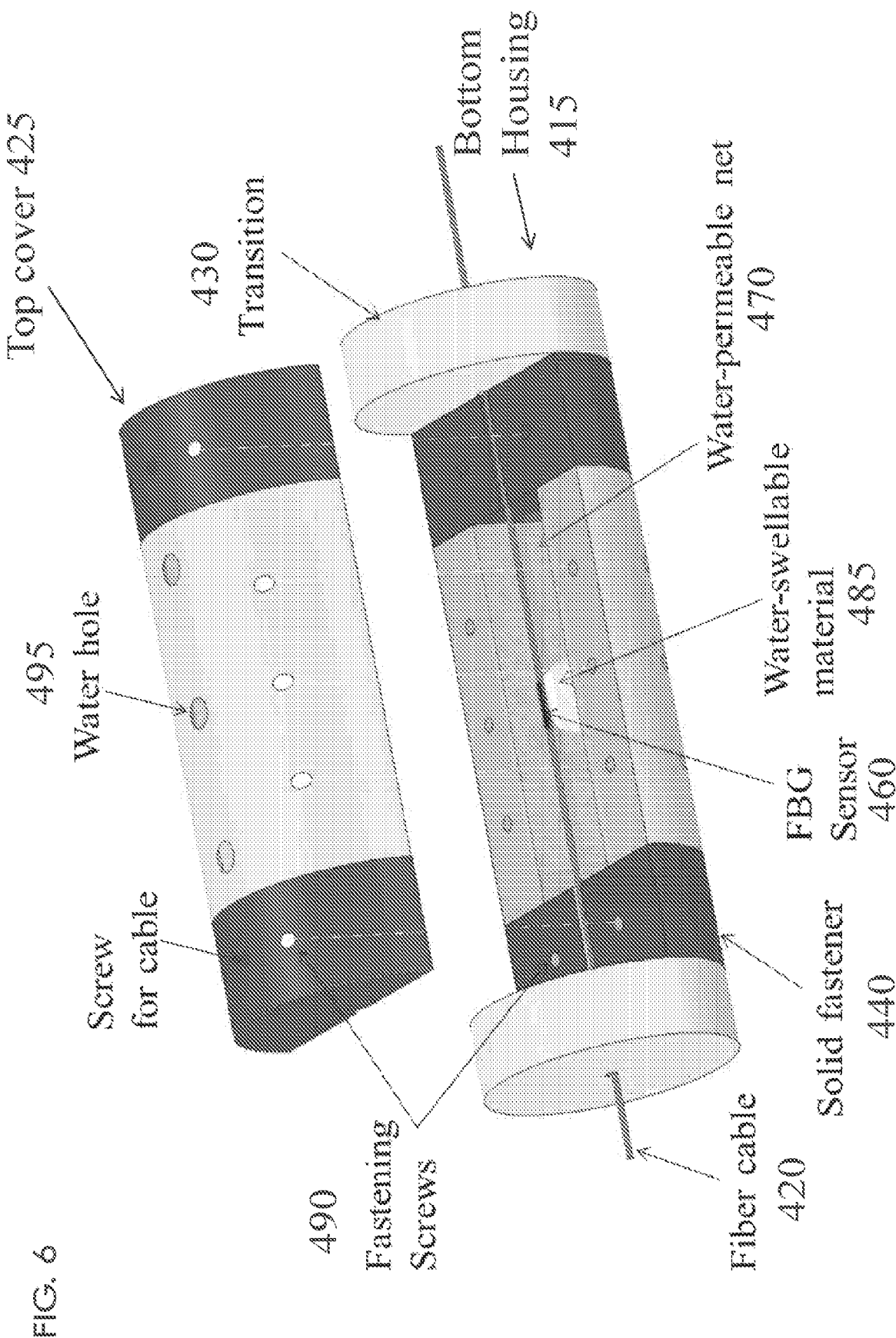
FIG. 6 illustrates a detailed configuration of an exemplary standard unit.
Figure 7:
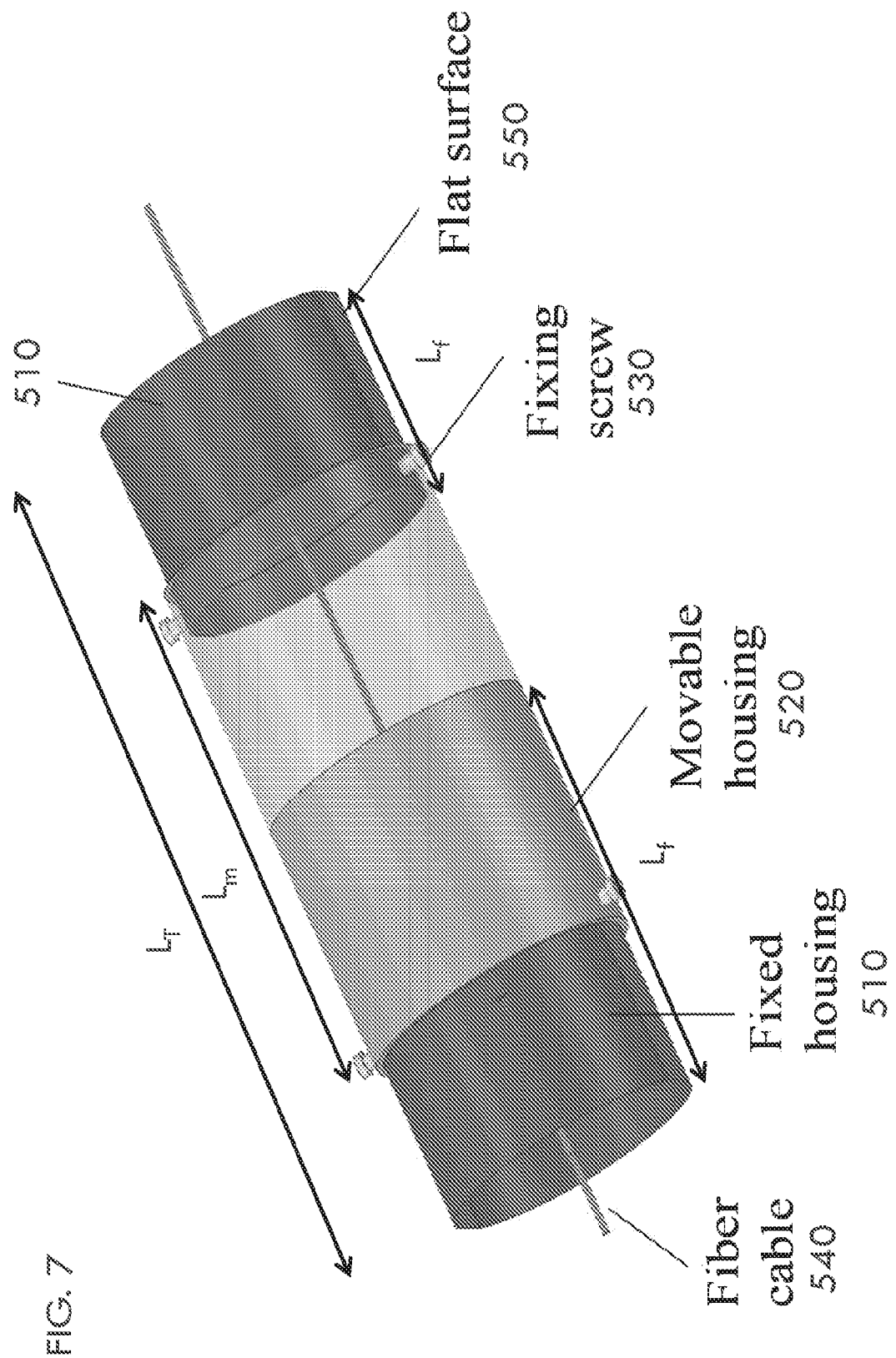
FIG. 7 illustrates a detailed configuration of an exemplary adjustable unit.

As shown in FIGS. 5-7, the scour sensor system (e.g. FIG. 5) generally comprises two types of units: standard unit(s) (e.g. FIG. 6) and adjustable unit(s) (e.g. FIG. 7). The scour sensor may include at least one standard unit and at least one adjustable unit. The number of standard unit(s) and adjustable unit(s) may be selected based on desired sensitivity (e.g. desired exposed depth accuracy), the total depth to be covered by the sensor, as well as other factors. In some embodiments, the standard unit comprises a fiber optic sensing component (e.g. FBG), water-swellable polymer material, fastening component(s), and transition component(s). In some embodiments, the adjustable unit is composed of two or more adjustable sections that allow an overall length of the adjustable unit to be adjusted. As a nonlimiting example, the adjustable unit may be a hollow cylinder and is used to connect the standard units. In some embodiments, fiber cable(s) may pass through the adjustable unit, and as such, the adjustable unit may provide protection for the fiber cables. The adjustable unit is variable in length and can be made of any material as required, from a steel pipe to plastic hose. By assembling numerous standard units with varied-length adjustable units, the device can be utilized for any required length and measurement accuracy (i.e. distance between each sensor).

Standard Units

The standard unit is the core of the scour monitoring system and each includes a fully functional sensing component, which means a standard unit by itself can be applied for detection. FIG. 6 illustrates the detailed configuration of an exemplary standard unit.

The standard unit may provide a bottom housing 415 and top cover 425 designed to accommodate and protect both the FBG sensor 460 portion of the fiber cable 420 and the water-swellable material 485. The cover 425 may be secured to the housing 415 to form a sensor chamber enclosing the FBG sensor 460 and the water-swellable material 485. Transition sections 430 are provided at each end of the standard unit and set the upper and lower boundaries of the chamber enclosing the FBG sensor 460. Transitions 430 may provide openings for the fiber cable 420 to pass through, but these openings in the transitions 430 may provide a waterproof seal to seal off the chamber. The transitions 430 may also be utilized to connect the standard unit to other standard or adjustable units. Notably, the only pathway to the sensor chamber when cover 425 is secured to housing 415 is the one or more openings 495. While the openings 495 are shown in the cover 425, the openings may be provided in the housing 415 in other embodiments. A fiber cable 420 with FBG sensor(s) 460 is longitudinally position to pass through the sensor chamber of the standard unit and provides wavelength monitoring of the FBG sensor(s). In some embodiments, fastener(s) 440 may be provided near each end of the standard unit to secure the fiber cable 420. As a nonlimiting example, a narrow conduit may be provided by the fastener(s) 440 to align the fiber cable through the longitudinal center of the housing 415. Parts of the fiber cable 420 pass through the conduits of the fastener(s) 440 that are provided on opposite ends of the cable in the standard unit can be fastened to secure and allow adequate strain transfer between the FBG sensor 460 and the water-swellable material 485. An adjustable fastener 490 (e.g. screw) may be provided to allow adjustment of tightness of fastener(s) 440. For example, the tightness of end fixation can be adjusted by a middle screw on the top half of the fastener 440. The solid fasteners 440 secure the fiber cable in a desired position and can also exert pretension on the fiber cable 420 if desired. In some embodiments, the fiber cable 420 may be sheathed by a thin furcation tube that may aid fastening. In some cases, two or more FBG sensors 460 may be multiplexed along the fiber cable 420 inside the chamber of a standard unit, which could increase the measurement accuracy. In some embodiments, multiple FBG sensors 460 in different units may be chained into one branch to allow multiple FBG sensors to be read by one channel. This forms a large FBG sensor network with minimal channels in a data acquisition board.

The polymer chamber is part of the sensor chamber, particularly the part below water-permeable net 470. The water-permeable net 470 separates the water-swellable material 485 from the FBG sensor 460. Further, the polymer chamber of the standard unit is utilized to properly secure the water-swellable material 485 in a desired position underneath the FBG sensor 460. In some embodiments, the water-swellable material 485 is disposed in the middle of the polymer chamber and underneath the FBG sensor 460. Since the expanded polymer of the water-swellable material 485 may increase in fragility during expansion, the polymer may be encased within a net 470 or thin-walled package made of water-permeable material to protect the polymer from being damaged. Openings along the longitudinal side of the other half of the sensor chamber or in the cover 425 may allow water to enter the sensing area and each opening is covered with a membrane to prevent soil entering the sensing chamber or the half containing the water-swellable material 485. Because the net 470 is water permeable and has openings, liquid water entering may reach penetrate the net or openings and be absorbed by the water-swellable material 485. Volumetric expansion of the water-swellable material 485 due to water absorption directly causes a change in the tension to the FBG sensor 460. As a result of the force exerted by the water-swellable material 485, the FBG sensor 460 and fiber cable 420 will experience a change in the wavelength of light passing through, thereby providing for water or moisture detection.

FIG. 8A shows a cross sectional side view of a standard and adjustable unit, and FIG. 8B shows a cross sectional view of a standard unit, which utilize the same item labeling as FIGS. 6-7 for the same components. In some embodiments, soil may be too permeable or have a high coefficient of permeability to prevent water from entering the openings 495 of the standard unit, thereby reducing the effectiveness of the sensor's ability to detect scour. Thus, some embodiments may provide a spring 810 and covering/flexible plate 820. One or more springs 810 may be placed into the openings 495, and flexible plate 820 may be place over the openings 495. When the standard unit is buried in soil, the springs 810 are compressed so that flexible plate 820 is engaged with the standard unit to prevent water from entering the openings 495, even in extremely permeable soil. If the soil is scoured away, the springs 810 exerted force pushes cover 820 away from the standard unit to uncover openings 495, thereby allowing water to enter the openings so the sensor can detect scour.

Adjustable Unit

The purpose of the adjustable unit is to allow adjustment of a length of the unit. Since a standard unit may be attached to either end of the adjustable unit, the separation distance between sensors can be adjusted as desired. Because the separation distance corresponds to depth when the scour monitoring system is installed at a desired location, it shall be apparent that the adjustable length allows the sensor depth and separation distance between sensors to be adjusted. In some embodiments, the adjustable unit may also allow a fiber cable to pass through the unit, such as to allow the coupling of multiple fiber cable(s) or FBG sensor(s). As a nonlimiting example, an adjustable unit may be a hollow cylinder used that can be connected to standard unit(s) and may protect the fiber cables outside of the standard unit(s).

FIG. 7 illustrates the configuration of the adjustable unit. The adjustable unit may have an adjustable total length $L_T$ that is provided by at least one fixed housing 510 with a length $L_f$ and movable housing 520 with a length $L_m$. The total length $L_T$ can be adjusted by modifying the amount of overlap between the movable housing 520 and fixed housing(s) 510. In the example shown, the length $L_f$ of the two fixed housings 510 are different, but can be identical in other embodiments. It shall be understood by one of ordinary skill in the art that the lengths length $L_f$ and $L_m$ can be arbitrarily chosen to be any suitable lengths. The adjustable unit may be hollow to allow a fiber cable 540 to pass through the internal chamber. One end of the fixed housing 510 is attaches to a standard unit or another adjustable unit, and the movable housing 520 may be coupled to the fixed housing 510 in a manner that allows the total length $L_T$ of the adjustable unit to be modified. As a nonlimiting example, the fixed housing 510 may be coupled to a standard or another adjustable unit utilizing any suitable means, such as fasteners, tubular threading, etc. As a nonlimiting example, an internal diameter of the movable housing 520 may be slightly larger than the outer diameter of the fixed housing 510, thereby allowing them to act as telescoping cylinders. In other embodiments, the diameters may be swapped or the internal diameter of the fixed housing 510 may be slightly larger than the outer diameter of the movable housing 520. The movable housing 520 may have the same diameter of the standard unit, thereby allow it to move in the longitudinal direction. The locking mechanism(s) 530 secures the fixed housing 510 and movable housing 520 together to form a desired total length $L_T$. In some embodiments, the locking mechanism(s) 530 may be present on the fixed housing 510. In other embodiments (such as the swapped diameter alternative discussed above), the locking mechanism(s) 530 may be present on movable housing 520. As a nonlimiting example, the locking mechanism(s) 530 may be two screws or other fasteners used to lock the movable housing 520 relative to the fixed housing 510 after positioning at a desired location to achieve the desired total length $L_T$. In some embodiments, the movable housing may be secured to another standard unit or adjustable unit utilizing any suitable means, such as fasteners, tubular threading, etc. In some embodiments, the fixed housing 510 may provide a flat surface(s) 550 to improve engagement of the locking mechanism(s) 530. In other embodiments, the flat surface(s) 550 may be provided on the movable housing 520.

In some embodiments such as the example shown in FIG. 7, the adjustable unit may provide two fixed housings 510 and a movable housing 520. The distance between the two fixed housings 510 may be adjusted by sliding the fixed housing towards or away from each other within the adjustable unit. As discussed previously, the fixed housings 510 may telescope with the movable housing 520. In embodiments providing two fixed housings 510, locking mechanisms 530 may be provided at both ends of the movable housing. In embodiments where the diameters are swapped, the locking mechanisms 530 on each of the two fixed housings 510. The length of the fiber cable 540 is selected to guarantee the safety of the cable. In particular, the length of the fiber cable 540 is sufficiently long so that the cable will not be damaged when the adjustable unit is set to a maximum total length. Further, the length of the fiber cable 540 may be selected to minimize flex or stress to the cable throughout the adjustable range of the adjustable unit. As a nonlimiting example, the length of the fiber cable 540 may be selected so that the cable forms a spiral that minimizes flex or stress. Referring back to FIG. 8A, which shows a cross section of a standard and adjustable unit, in some embodiments, the adjustable unit may further provide a spring 560 longitudinally positioned in the bore of the adjustable unit to aid ease of adjustment for the adjustable unit. For example, the spring 560 may be place on the fiber cable in the adjustable unit.

If the scour sensor system is exposed to water, possible false readings may result from the leakage of water from the chamber of one standard unit into other units through the fastener conduits or transitions. Water may also enter the adjustable units and leak into the standard units through the conduits or transitions. Therefore, as discussed previously, the transition components of the standard unit are designed to prevent water travel among sequential units and thus fluidically isolate each standard unit from each other. In some embodiments, the transition parts may be filled with dehydrant such as a hygroscopic substance to absorb undesirable fluid escaped from an isolated standard unit.

Applications of the Sensing System

Figure 9:
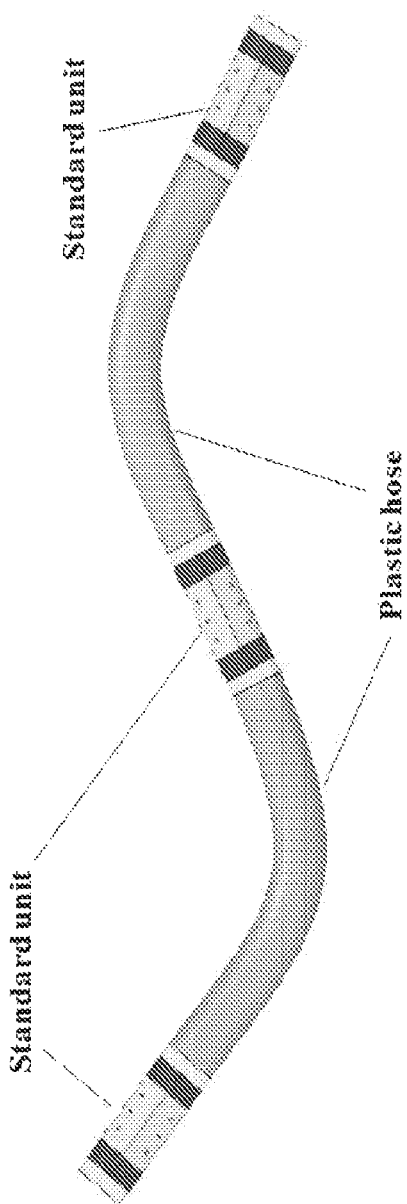
FIG. 9 illustrates another embodiment of a sensor system with flexible plastic tubing used as adjustable units.

An advantage of the proposed scour sensing system is its interchangeability. Firstly, the sensing elements can be substituted or combined with other types of materials. In some embodiments, the water-swellable material may be interchanged or combined with a material sensitive to other substances, such as oil, gas, and other chemicals. These modified sensing systems can be used for other types of chemical sensing. Secondly, the housing design allows dimensional flexibility. As a nonlimiting example, the size of the housing can be designed to match different requirements, and the adjustable units can also be designed to adapt any required length. In some embodiments, the material(s) of the housing can be chosen based on the desired application. As a nonlimiting example, FIG. 9 illustrates another embodiment of the sensor system, where flexible plastic tubing is used for the adjustable units. This interchangeability provided by the sensor system allows the system to be vertically inserting into the ground, laid down horizontally (e.g. on the riverbed or seabed), or positioned in nearly any desired arrangement. As nonlimiting examples, this sensor system is able to detect/monitor scour damage or moisture intrusion in any structure where scour or moisture monitoring may be desired, such as, but not limited to, bridges, levees, dams, subsea pipelines, offshore structures, wind turbine structures, etc. Moreover, when the water inside the device evaporates or flows out, the water-swellable material or polymer will shrink to its original status. Thus, the device is reusable and able to monitor the entire scour process in the long-term.

In order to monitor long term history of the scour sensor system, the measurement should be taken repeatedly at predetermined intervals (e.g. weekly, monthly, etc.) to collect data. Otherwise, a wireless station near the site is needed for the real-time long-term monitoring. As discussed previously regarding FIG. 3, an above water system or station may be provided that is coupled to the sensors. This station may provide memory to store collected data and/or a wireless transmitter to send the data to another location.

A reading of wavelength(s) of the FBG sensors in dry conditions may be utilized to provide baseline value(s) for determining if moisture/water has been detected later when the system is deployed. Once the system is deployed, the wavelengths of each unit may be monitored for changes from their baseline values. In some embodiments, the sensor system may include specially designed bottom and top ends to facilitate ease of deployment. As nonlimiting examples, a sharp bottom end may be provided to facilitate the entry of the system into the soil. Further, a special top end may provide a platform that allows external driven force to drive the system into the soil. In addition to the baseline measurements, initial deployment measurements may be taken to determine the initial depth of fluid exposure. With the length of the housing and length of each segment known, an operator or user can compare measurements at the time of initial deployment to present values at each sensor to determine an approximate depth of scouring. In the presence of water, the water-swellable material or polymer material expands in volume and bends the fiber optic sensor. The wavelength shifting of the sensor caused by the bending is then transduced into a measured signal, which indicates this sensor is no longer covered with soil, i.e. this unit has exposed to water. The scour depth or location can be identified accordingly by the known depth of the exposed sensor.

For the purpose of illustration, the application of the sensing system on the scour monitoring of bridge foundation is demonstrated below. Referring back to FIG. 3, the general layout of the sensing system 10 positioned adjacent to a pier/pile structure 20. The sensing system 10 provides three sensors 1, 2, 3 in standard units that are separated by adjustable units. A securing means, such as brackets, may be used to secure the scour device in a desired position adjacent to the structure to prevent excessive relative movement between the structure and the sensors. Note that the number of units, as well as the lengths of the adjustable units, in the scour monitoring system may be adjusted as desired to achieve a desired overall length and desired sensitivity, which corresponds to the separation distance between the sensors.

The sensors will be monitored for changes in wavelength to determine whether a particular sensor/unit has been exposed to fluid. In the example shown, at the initial time of the device first installed, the ground level of the riverbed (initial depth) is $d_i$, with sensor 1 in water and sensors 2 and 3 in the ground. As the water flow passes the structure, the sediment may be eroded away to expose the fiber optic sensors to the water over time. In the example shown, the ground level has degraded to the current riverbed depth (now) $d_c$, and as a result, sensor 2 is currently exposed to the water and will provide different readings that the baseline or initial deployment readings. By monitoring the individual fiber optic sensors, which have a known separation distance, the depth of fluid exposure can be determined by determining the lowermost position of a sensor detecting the fluid exposure. For example, the current ground level or riverbed depth can be roughly determined by checking the sensors indicating exposure to water. In the example, the wavelength change of sensor 2 indicates water exposure, whereas sensor 3 has no wavelength change at a simultaneous time. Moreover, the depth of water exposure or level may be determined by the distance between the upper most and the lowest fiber optic sensor. Comparison between the historic and current data may allow the amount of scouring or the change in exposure depth over time to be determined. For example, by comparing an initial depth ($d_i$) of water exposure at an initial time, which may be when the system was initially installed or any other time afterwards, to a current measured depth ($d_o$), a depth or amount of scouring ($d_s$) can be determined by subtracting a current depth from the initial depth ($d_s = d_c - d_i$). It is also known that water level vary. Thus, some sensors may be exposed to the air if the water level recedes enough. As discussed earlier, once the water or fluid flows out or evaporates, the water-swellable material may return to its original size and the FBG cable can return to its original shape. Thus, the scour sensor system may also provide historical water level data. Further, in some cases, water currents may cause the shifting of soil or debris around the structure that results in a build up of the riverbed. This may result in a previously exposed sensor being covered up by the shifted soil or debris, and once the water recedes or evaporates, the water-swellable material may return to its original size. Therefore, long-term monitoring of the sensor response will allow operators or users to record the history of the water level and the ground level (scour depth) around the structure. In the following discussion, a scouring test similar to the scenario discussed above was performed with a fabricated sensor system to perform a feasibility analysis.

Experimental Example

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Fabricated Prototype

Figures 10A, 10B:
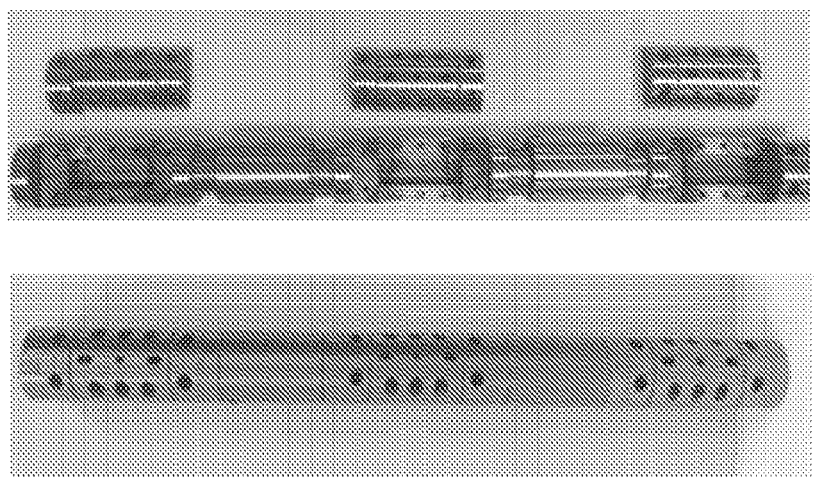
FIGS. 10A-10B show a fabricated prototype with three standard units, in a closed assembled view and view with top covers removed, connected by two adjustable units.
Figures 11A, 11B:
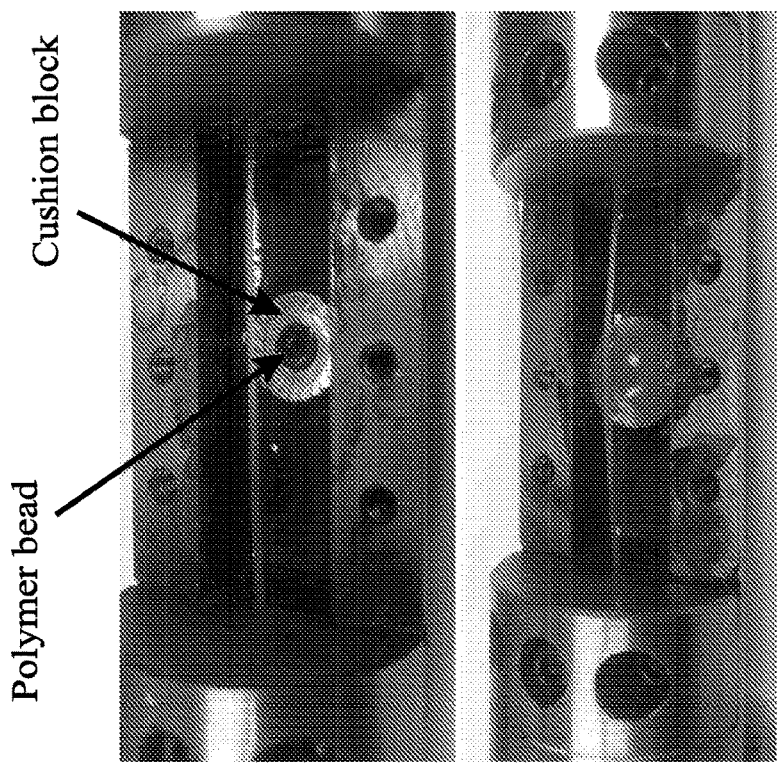
FIGS. 11A-11B respectively show a sensor chamber of a prototype with a water-swellable bead before and after expansion.

A prototype of the sensing system was designed and fabricated in the laboratory. FIGS. 10A-10B show the fabricated prototype with three standard units connected by two adjustable units, where the closed assembled view is shown in FIG. 10A and the sensor system with standard unit covers opened shown in FIG. 10B. The standard unit was 100 mm long and the adjustable unit was 100-150 mm long, where each adjustable unit can be extended from 100 mm to 150 mm The prototype was made of A36 steel and the total length of the sensing system could be varied from 500 mm to 600 mm Experimental Tests: Calibration The fabricated prototype was used to verify the proposed sensing system. Three FBG sensors, i.e., sensor 1 (1570 nm center wavelengths), sensor 2 (1582 nm), and sensor 3 (1554 nm) were separately placed in the three standard units. Each FBG was prestrained with a positive shift (tension) before fixed at the conduits of the housing. A FBG based temperature sensor was placed in the nearby area to compensate for thermal effects. The four sensors are independent from each other and were connected to an interrogator (Micron Optics sm130) that sent data via ethernet to a PC running ENLIGHT. Data was acquired in parallel for all four sensors at a rate of 1 Hz. Before the test, one polymer bead was placed on a cushion block underneath the pretensioned FBG cable in each unit (FIG. 11A). A water-permeable jacket was placed between the polymer bead and the FBG cable to prevent the cutting of the soft expanded bead against the cable (jacket not shown for purposes of illustration). A syringe was used to inject readily available drinking water into the standard unit chamber. A small cushion block with a height of 5 mm was placed underneath the bead to increase the contact between the bead and the FBG cable. The initial lengths of fastened cables in the three units were different due to pretensioning, boundary conditions (tightness of end fixation), and cable stiffness. As can be seen by comparing FIGS. 11A-11B, the original diameter of the bead is much smaller (e.g. about 2.5 mm) than the expanded diameter (e.g. around 17 mm) The bead diameter expanded about 6.8 times and the volume about 314 times.

Figure 12:
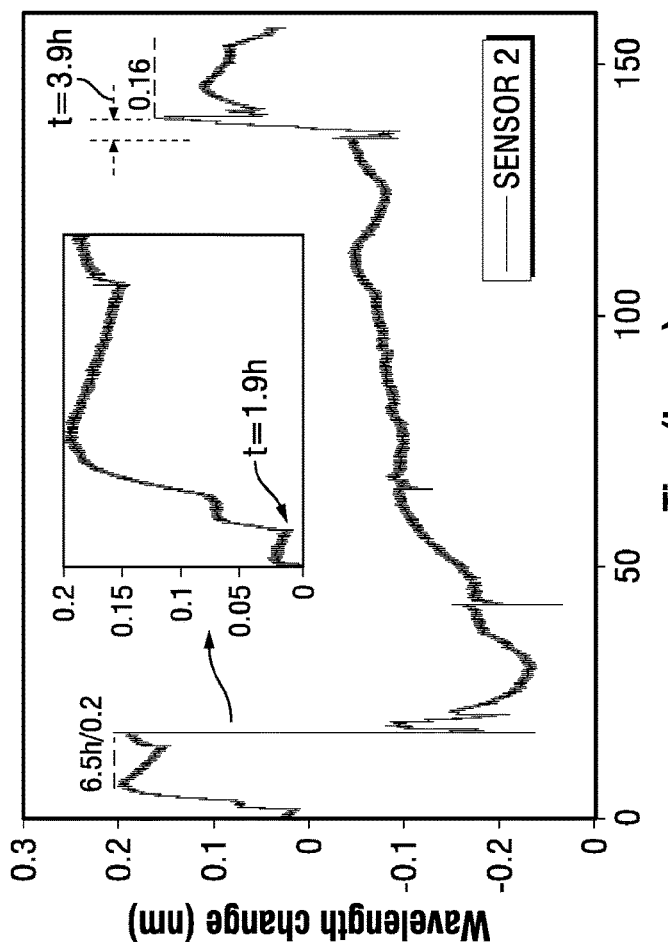
FIG. 12 shows the wavelength change of sensor 2 for two cycles.

FIG. 12 shows the wavelength change of sensor 2 (1582 nm center wavelength) for two cycles with the inset showing wavelength change up to approximately 15 hours. In the first cycle, after the water was injected in the chamber, the polymer started to absorb water and swell. In the first 1.9 h, the wavelength change was small because the polymer did not yet make contact with the fiber cable. After the polymer touched the cable, the wavelength of the sensor started to increase rapidly. In about 6.5 h, the wavelength change reached its maximum value, 0.2 nm. Afterwards, the polymer gradually shrank and the wavelength change decreased accordingly. In about 17 h, the polymer completely lost the contact with the FBG cable, the wavelength sharply dropped to its original wavelength. After several days, the polymer completely returned to its original status and the second cycle was subsequently conducted. In this second cycle, the wavelength change reached its maximum (0.16 nm) in 3.9 h.

Figures 13, 14:
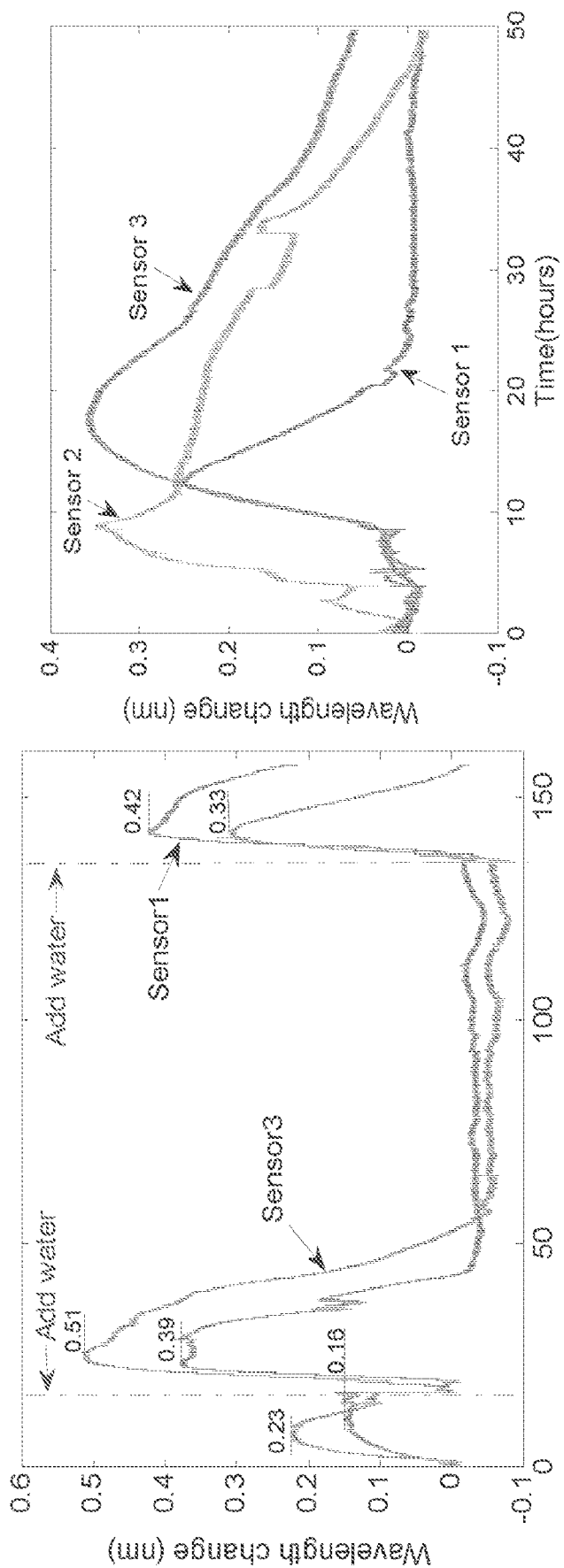
FIG. 13 shows the wavelength change of sensors 1 and 3 for three cycles.
FIG. 14 shows wavelength change over time for sensors with cube-shaped polymers.

FIG. 13 shows the wavelength change of sensors 1 and 3 for three cycles. In the first cycle at t=0, after a small amount of water was injected in the chamber, the maximum wavelength changes are 0.16 nm and 0.23 nm for sensor 1 and sensor 3, respectively. When the water was absorbed by the polymer and evaporated to the air, the polymers started to shrink and the wavelength almost returned to its original value. Since only a small amount of water was injected, the maximum value is relatively small. After the wavelength returned to its original value, water was added as the second cycle, and the wavelength change quickly increased to the peak, 0.39 nm and 0.51 nm for sensors 1 and 3, respectively, which are more than double the peaks in the first cycle. In the second cycle, more water was injected to allow the polymers to expand fully. Subsequently, sufficient time was given for the polymer material to shrink. In the third cycle, the maximum wavelength changes are 0.42 nm and 0.33 nm for sensors 1 and 3, respectively. The peak value of sensor 1 in the third cycle is slightly larger than that in the second cycle, while the peak value for sensor 2 decreased. However, in general, a significant and detectable wavelength change can be repeated, which implies the polymer material is repeatable.

Meanwhile, another shape of polymer material was tested for comparison to evaluate the feasibility of utilizing different shapes. A cube-shaped polymer was tested and the wavelength change over time is shown in FIG. 14. Compared to the spherical bead, the cube polymer has more contact area and the induced force is similar to a distributed force that could induce more strain on the FBG cable. The comparison between those two types is summarized in Table 1, which shows the swelling time of the cube polymer is longer and the peak value is mostly smaller than that of the bead polymer. The reason is that we did not add water into the chamber after the water was absorbed by the polymer, causing the cube polymer to not be fully expanded.

TABLE 1

Wavelength change peak time and value

| Polymer | Cycles | Sensor 1 | | Sensor 2 | | Sensor 3 | |
|---|---|---|---|---|---|---|---|
| | | Time (hr) | Value (nm) | Time (hr) | Value (nm) | Time (hr) | Value (nm) |
| Bead | Cycle 1 | 8.3 | 0.16 | 6.5 | 0.20 | 7.6 | 0.23 |
| | Cycle 2 | 6.1 | 0.39 | | | 7.5 | 0.51 |
| | Cycle 3 | 6.9 | 0.42 | 4.0 | 0.16 | 5.6 | 0.33 |
| Cube | Cycle 1 | 12.4 | 0.26 | 8.6 | 0.35 | 17.6 | 0.36 |

Scour test

Figures 15A, 15B, 15C, 15D:
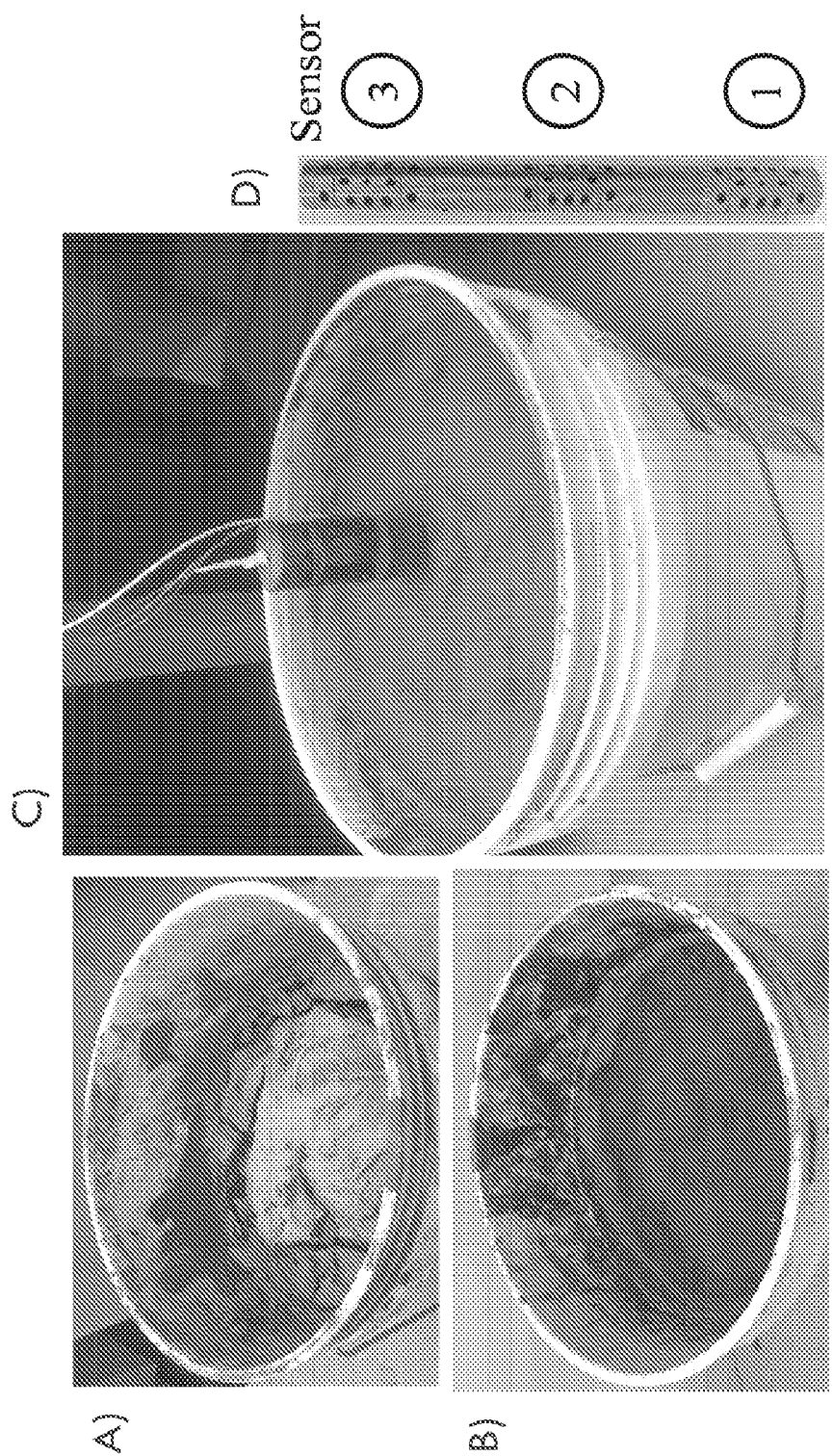
FIGS. 15A-15D shows an experimental test setup with a prototype in a container.

The fabricated prototype was also adopted to verify the application on bridge scour monitoring. FIGS. 15A-15D shows the experimental test setup with the prototype in a container. Nearly two thirds of the container was filled with soil (FIG. 15A) and the water was then poured into the container (FIG. 15B). The water stayed in the container for one week to let the soil become fully saturated prior to the insertion of the prototype (FIG. 15C). During the insertion process, a potential problem is that before reaching the soil bed, the prototype (before insertion into soil FIG. 15D) will pass through a layer of water, which may prematurely activate the sensor units. One solution is to sheath the prototype inside a hollow tube that has the bottom covered with a soft and waterproof membrane that can be easily punctured by a sharp object, such as the bottom end of the prototype. Thus, the sheathed prototype, upon reaching the surface of the soil bed, can further be driven deeper into the soil by puncturing and advancing past the membrane. In the present experiment, the soil-facing end of the prototype is flat, which would prevent easy puncture of the membrane. For practical deployment, an additional pile driving design (e.g. a sharp conical lower tip) may be included to easily puncture the membrane and facilitate embedment into the soil. In the present experiment, in order to avoid water entering the sensor units, the water was taken out prior to inserting the prototype into the saturated soil, and the water was poured back after the prototype was in place.

Figure 16A:
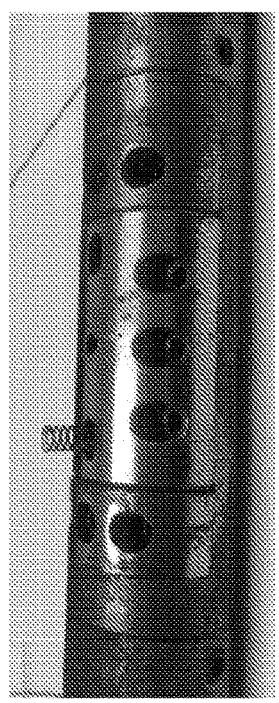
FIGS. 16A-16B respectively show a spring installed into an opening of a top cover and a flexible plate covering the openings.
Figure 16B:
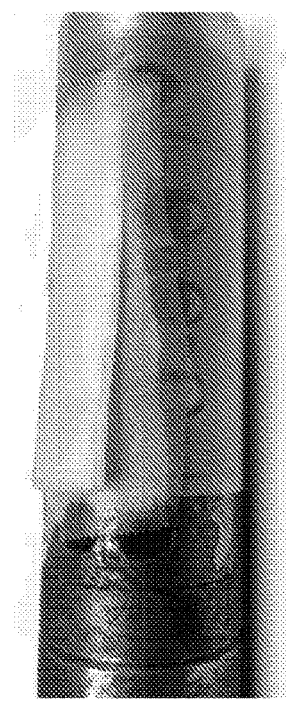

A concern can be raised about the possibility that the water absorbed in the soil may leak into the sensor units after a certain amount of time after embedment, depending on the soil type. In order to prevent liquid water from entering the sensor chambers, a specific preventative measure was adopted. As shown in FIGS. 16A-16B, a spring was installed into one of the three upper openings (FIG. 16A) and a flexible plate or covering was used to cover the openings (FIG. 16B). One end of the plate was mounted to the device, and the other end rested on the spring. When the prototype is to be inserted into the soil, the soil pressure would force the plate to compress the spring and thus close the three openings. In such way, the water in soil would not enter the sensor units. When the soil is scoured or removed, the spring would push the plate to open the three openings and let the water enter the chamber. It is noted that humidity will not affect the sensor response.

In each of the three standard units, a cube-shaped polymer was used. The bottom two units, i.e. sensor 1 and sensor 2, were buried in soil, as shown in FIG. 15C. Sensor 3 was always above the soil level for comparison and a temperature sensor was used for temperature drift compensation. Since the prototype is slightly taller than the tank, a portion of the top unit is in water but Sensor 3 is still out of water.

Figures 17A, 17B, 17C:
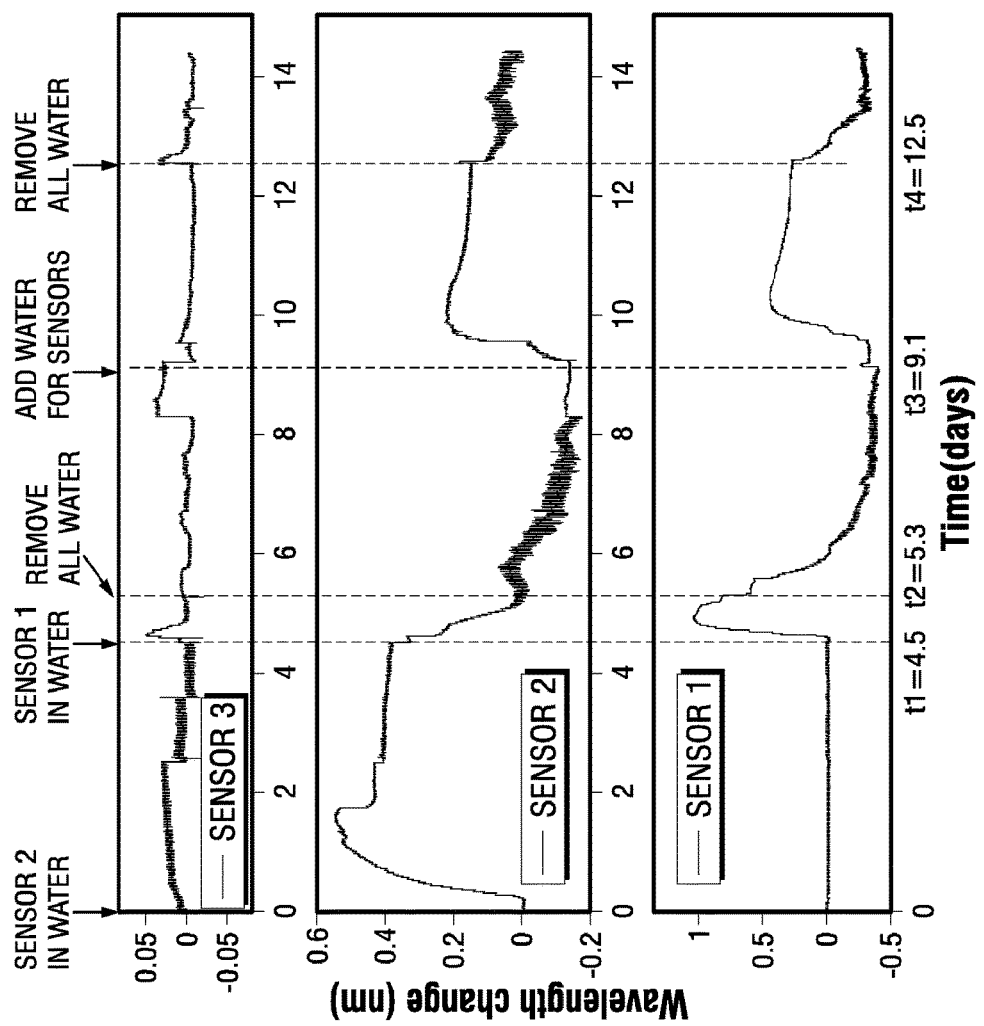
FIGS. 17A-17C respectively show the wavelength changes for the three sensors over time.

FIGS. 17A-17C respectively show the wavelength changes for the three sensors over time. In order to simulate the scour process happened on the bridge foundation, the top part of soil was manually removed to expose sensor 2 to water at initial time t=0. As the water entered the internal sensor chamber of sensor 2 and was absorbed by the polymer material, the FBG wavelength drastically increased as shown in FIG. 17B. In about 1.5 days, the wavelength change of sensor 2 reached to its maximum, about 0.6 nm. A sudden drop can be observed right after the peak, which resulted from damage to the polymer material of sensor 2 that was broken by the fiber cable. After that, the wavelength change is almost constant. From the beginning to the time t1=4.5 days, the wavelength changes in sensor 1 and sensor 3 are ignorable. By comparing the responses of all sensors, the significant change in sensor 2 indicated that the sensor was exposed to the water and the current soil level can be identified. Meanwhile, the unchanged wavelength in sensor 1 proves that the spring and flexible plate arrangement shown in FIG. 16A-16B is able to prevent water intrusion effectively. At the time t1=4.5 days, more soil was removed to expose sensor 1 to water, and it should also be noted that at the same time sensor 2 was out of water due to the water level decline. The wavelength of sensor 2 gradually decreased due to the shrinkage of the polymer, while the wavelength change of sensor 1 increased very fast to the maximum of 1 nm. A similar drop for sensor 1 can be observed after the peak. At the time t2=5.3 days, all the water was taken out to expose sensor 1 to air and the wavelength change decreased continuously. The wavelengths of sensor 2 and sensor 1 return to lower than that of their original status as observed from the negative wavelength change. This state was maintained for about 4 days to allow the sensors to completely dry. At the time t3=9.1 days and t4=12.5 days, another cycle was conducted for the bottom two sensors to study the repeatability of the polymer material. In particular, water was added to cover both sensors 1 and 2 at t3, and the water was later removed at t4. Similarly, significant sensor responses were observed and the wavelength change increased to a relatively small peak. Therefore, the above result verifies the capability of this scour monitoring system to detect the ground level (scour depth), and also confirms the repeatable use of the sensor and polymer. That is, the proposed system is capable of monitoring ground level or riverbed changes and the entire scour process in the long term.

Conclusions

The study verifies an innovative system using fiber Bragg grating (FBG) sensors and water-swellable polymers is feasible for scour monitoring. The polymer material has the feature of absorbing liquid water and swelling several times of the original volume, which consequently induces tension on the FBG sensor. The measured wavelength shifting of the sensor indicates this sensor is no longer covered with soil, i.e. the soil level has decreased to the elevation of this sensor. By comparing the responses of all sensors, the significant sensor response is able to indicate that the sensor was exposed to the water and the current soil level can be identified by the lowest sensor having significant responses. Several tests were conducted to verify the functionality of the design and the results indicate that the proposed system is capable of monitoring changes in the soil level. Moreover, the repeatability shown by the experimental sensors confirms the sensors can be subjected to multiple uses. Thus, the sensors allow the system to record the history of the water level and the ground level (scour depth) around the structure in the long term.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A scour monitoring system, the system comprising:
    at least one standard unit, wherein the standard unit comprises
        a bottom housing,
        a top cover with one or more openings,
        a sensor chamber formed when the top cover is secured to the bottom housing, wherein the one or more openings only allow water to enter the sensor chamber when soil is scoured away, and the openings are a sole pathway to the sensor chamber when the top cover is secured to the bottom housing,
        a fiber cable longitudinally positioned in the standard unit to pass through the sensor chamber, wherein a fiber Bragg grating (FBG) is provided for a portion of the fiber cable, and
        a water-swellable material positioned in the sensor chamber, wherein the water-swellable material is positioned to deform the FBG when water is absorbed by the water-swellable material.

2. The system of claim 1, wherein the standard unit further comprises a water-permeable net separating the water-swellable material from the FBG.

3. The system of claim 1, wherein the standard unit further comprises fasteners securing opposite ends of the fiber cable separated by the FBG, and the fasteners allow a tension on the fiber cable to be adjusted.

4. The system of claim 1, wherein the standard unit further comprises transition sections at each end of the standard unit, and each of the transition sections provide a sealed opening for the fiber cable to pass through.

5. The system of claim 1, wherein the standard unit further comprises
    a spring positioned in one of the one or more openings of the top cover, and
    a flexible plate positioned on top of the one or more openings, wherein when deployed in soil, the soil causes the flexible plate to compress the spring and cover the openings.

6. The system of claim 1 further comprising at least one adjustable unit formed from flexible tubing, wherein the adjustable unit is coupled to the standard unit.

7. The system of claim 1 further comprising at least one adjustable unit coupled to the standard unit, wherein a length of the adjustable unit adjustable.

8. The system of claim 7, wherein the adjustable unit comprises
    a fixed housing,
    a movable housing coupled to the fixed housing in a telescoping arrangement, and
    a locking mechanism for securing the fixed housing and the movable housing together to form a desired total length.

9. The system of claim 7, wherein the adjustable unit comprises
    a first fixed housing,
    a second fixed housing,
    a movable housing coupled to the first fixed housing and the second fixed housing in a telescoping arrangement, wherein the first fixed housing and the second fixed housing are disposed on opposite ends of the movable housing, and
    a locking mechanism for securing the first fixed housing, the second fixed housing, and the movable housing together to form a desired total length.

10. The system of claim 7, wherein the adjustable unit further comprises a spring longitudinally positioned in a bore of the adjustable unit.

11. The system of claim 1 further comprising a surface unit coupled to the scour monitoring system, wherein the surface unit provides a FBG interrogator, memory, processor, transceiver, or a combination thereof.

12. A method for scour monitoring, the method comprising:
    obtaining baseline readings in dry conditions for a scour monitoring system, wherein the system includes two or more sensors, having a predetermined separation distance, wherein the two or more sensors comprises a first sensor unit, wherein the unit comprises
    a bottom housing,
    a top cover with one or more openings,
    a sensor chamber formed when the top cover is secured to the bottom housing,
    wherein the one or more openings only allow water to enter the sensor chamber when soil is scoured away, and the openings are a sole pathway to the sensor chamber when the top cover is secured to the bottom housing,
    a fiber cable longitudinally positioned in the standard unit to pass through the sensor chamber, wherein a fiber Bragg grating (FBG) is provided for a portion of the fiber cable, and
    a water-swellable material positioned in the sensor chamber, wherein the water-swellable material is positioned to deform the FBG when water is absorbed by the water-swellable material; and
a second sensor that comprises
    a fiber cable positioned in a sensor chamber, wherein a fiber Bragg grating (FBG) is provided for a portion of the fiber cable, and
    a water-swellable material positioned in the sensor chamber adjacent to the FBG, wherein the water-swellable material deforms the FBG when water is absorbed by the water-swellable material;
deploying a scour monitoring system in a desired location; and
periodically monitoring wavelengths of the two or more sensors for a change in wavelength.

13. The method of claim 12, further comprising adjusting the separation distance between the two or more sensors to provide a desired separation distance.

14. The method of claim 12, wherein when the change is wavelength is detected, calculating a current depth of water exposure ($d_c$) detected by the two or more sensors, and subtracting an initial depth of water exposure ($d_I$) based on the baseline readings to determine an amount of scouring.

15. The method of claim 14, wherein the method further comprises continuing to periodically monitoring wavelengths of the two or more sensors for a further change in wavelength, wherein when the further change is wavelength is detected, calculating an updated depth of water exposure ($d_{c+1}$) detected by the two or more sensors, and subtracting the current depth of of water exposure ($d_c$) based on the baseline readings to determine an updated amount of scouring.

16. The method of claim 14, wherein an alarm is provided to an operator if the amount of scouring exceeds a predetermined amount.

17. The method of claim 12, further comprising determining a current water level from the current measurements, and comparing the current water level to prior water level measurements to determine whether a water level has changed.

18. The method of claim 17, wherein an alarm is provided to an operator if the current water level exceeds a predetermined level.

19. The method of claim 17, wherein an alarm is provided to an operator if the current water level is below a predetermined level.

* * * * *